US012101780B2

(12) United States Patent
Xue

(10) Patent No.: US 12,101,780 B2
(45) Date of Patent: Sep. 24, 2024

(54) MESSAGE SENDING METHOD, MESSAGE RECEIVING METHOD, APPARATUS, AND DEVICE

(71) Applicant: HUAWEI TECHNOLOGIES CO., LTD., Shenzhen (CN)

(72) Inventor: Lixia Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 401 days.

(21) Appl. No.: 17/366,258

(22) Filed: Jul. 2, 2021

(65) Prior Publication Data

US 2021/0345393 A1 Nov. 4, 2021

Related U.S. Application Data

(63) Continuation of application No. PCT/CN2020/070219, filed on Jan. 3, 2020.

(30) Foreign Application Priority Data

Jan. 3, 2019 (CN) ......................... 201910004384.7

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04L 27/2601* (2013.01); *H04W 52/0235* (2013.01); *H04W 72/0446* (2013.01)

(58) Field of Classification Search
CPC ............. H04W 72/23; H04W 52/0235; H04W 72/0446; H04L 1/1812; H04L 27/2601
(Continued)

(56) References Cited

U.S. PATENT DOCUMENTS

2014/0086173 A1 3/2014 Sadeghi et al.
2015/0173039 A1 6/2015 Rune et al.
(Continued)

FOREIGN PATENT DOCUMENTS

CN 106797530 A 5/2017
CN 107466101 A 12/2017
(Continued)

OTHER PUBLICATIONS

Stern-berkowitz Janet A. (WO 2016/025899 A1), Feb. 18, 2016, Supporting Random Access and Paging Procedures for Reduced Capability Wtrus in an LTE System.*
(Continued)

*Primary Examiner* — Nghi H Ly
(74) *Attorney, Agent, or Firm* — Rimon PC

(57) ABSTRACT

This application discloses a message sending method, a message receiving method, an apparatus, and a device. The message sending method includes: A network device sends, by using a physical downlink control channel (PDCCH), downlink control information (DCI) with s a cyclic redundancy check (CRC) bit, wherein the DCI is in a first DCI format or a second DCI format, wherein the DCI is used to indicate to a terminal device to enter a sleep mode at a first moment. The network device receives a response message sent by the terminal device in response to the DCI.

16 Claims, 10 Drawing Sheets

(51) Int. Cl.

| | |
|---|---|
| ***H04L 27/26*** | (2006.01) |
| ***H04W 52/02*** | (2009.01) |
| ***H04W 72/0446*** | (2023.01) |

(58) Field of Classification Search
USPC ........ 370/311, 328, 329, 338, 341, 345, 350
See application file for complete search history.

(56) References Cited

U.S. PATENT DOCUMENTS

| | | | |
|---|---|---|---|
| 2015/0195069 | A1 | 7/2015 | Yi et al. |
| 2016/0014718 | A1 | 1/2016 | Mysore Balasubramanya et al. |
| 2017/0215172 | A1 | 7/2017 | Yang et al. |
| 2017/0223686 | A1 | 8/2017 | You et al. |
| 2018/0234998 | A1 | 8/2018 | You et al. |

FOREIGN PATENT DOCUMENTS

| | | | |
|---|---|---|---|
| WO | 2018027656 | A1 | 2/2018 |
| WO | 2018175596 | A1 | 9/2018 |

OTHER PUBLICATIONS

3GPP TSG-RAN WG1 Meeting #90, R1-1712621, Power consumption reduction for paging and connected-mode DRX for NB-IOT ,Ericsson, Prague, Czech Republic, 21st Aug. 25, 2017, total 8 pages.

* cited by examiner

MESSAGE SENDING METHOD, MESSAGE RECEIVING METHOD, APPARATUS, AND DEVICE

CROSS-REFERENCE TO RELATED DISCLOSURES

This application is a continuation of International Application No. PCT/CN2020/070219, flied on Jan. 3, 2020, which claims priority to Chinese Patent Application No. 201910004384.7, filed on Jan. 3, 2019. The disclosures of the aforementioned applications are hereby incorporated by reference in their entireties.

TECHNICAL FIELD

This application relates to the communications field, and in particular, to a message sending method, a message receiving method, an apparatus, and a device.

BACKGROUND

In a new-generation communications system, for example, a 5th generation (5G) mobile communications system, a discussed topic is how to reduce power consumption of user equipment (UE). An important approach is to reduce power consumption of the UE when the UE performs unnecessary (PDCCH) monitoring. Statistics show that, in an existing long term evolution (LTE) network, no indication message is detected through most PDCCH monitoring performed by the UE, and the PDCCH monitoring performed by the UE through which no indication message is detected causes a large amount of power consumption, and wastes a relatively high proportion of power consumption of the UE.

Currently, to reduce power consumption of the UE in a PDCCH monitoring process, a method for dynamically indicating the UE to skip PDCCH monitoring is used. The method is also referred to as a go-to-sleep (GTS) technology. To be specific, a GTS signal or GTS signaling is used to indicate the UE to skip PDCCH monitoring for a period of time, to save power consumption of the UE. Specifically, FIG. 1 shows an example of saving power consumption of UE by using a GTS signal. After receiving the GTS signal, the UE goes to sleep and wakes up after a sleep GTS duration (GTS duration) ends. The GTS signal may be carried by a physical layer signal or a layer-1 (L1) signal. Because the UE does not perform PDCCH monitoring during the GTS duration, power consumption of the UE during continuous monitoring is reduced.

However, in a process in which the GTS signal is carried by the L1 signal to indicate the UE to enter a sleep state, GTS signal detection may be inaccurate. For example, there may be a problem of a false alarm. Specifically, the false alarm means that when a base station at a transmit end does not send the GTS signal, UE at a receive end detects a false GTS signal due to factors such as interference and noise (for example, when energy detected by the UE exceeds a preset threshold, the UE considers that the GTS signal is received), and then enters a sleep mode. Consequently, as shown in FIG. 2, a PDCCH subsequently sent by the base station is not detected (or monitored) by the UE, resulting in impact on system performance.

SUMMARY

Embodiments of this application provide a message sending method, a message receiving method, an apparatus, and a device, to resolve a problem that reliability may be low when a GTS signal is used to indicate UE to enter a sleep state.

According to a first aspect, an embodiment of this application provides a message sending method. The method includes: A network device sends, by using a physical downlink control channel (PDCCH), downlink control information (DCI) with a cyclic redundancy check (CRC) bit, wherein the DCI is in a first DCI format or a second DCI format, where the DCI is used to indicate a terminal device to enter a sleep mode at a first moment, the first DCI format is a DCI format used to indicate a scheduling of physical downlink shared channel (PDSCH), and the second DCI format is a DCI format used to indicate a scheduling of physical uplink shared channel (PUSCH). The network device receives a response message that is sent by the terminal device based on the DCI.

The first DCI format includes a format 1_0 and a format 1_1, and the second DCI format includes a format 0_0 and a format 0_1.

According to the method provided in this aspect, the network device transmits, by using the PDCCH, the DCI with channel coding and CRC check, so that accuracy of an indication of entering a sleep state can be improved, and the terminal device is prevented from entering the sleep mode when the terminal device does not need to enter the sleep mode, thereby improving system performance.

In addition, based on the response message fed back by the terminal device, the current network device can indicate, based on the DCI, the terminal device to reach an agreement upon a behavior of PDCCH monitoring, thereby improving reliability of sending a GTS message to indicate the terminal device to enter the sleep mode. In addition, the terminal device may also enter the sleep mode based on the DCI delivered by the network device, so that a circuit used to receive a downlink message can be disabled during the GTS sleep duration, thereby reducing power consumption of the terminal device.

With reference to the first aspect, in a possible implementation of the first aspect, the response message includes a hybrid automatic repeat request (HARQ) response. When the DCI is in the first DCI format, the first moment includes any one of the following:

- a first moment being a start moment of an orthogonal frequency division multiplexing (OFDM) symbol next to a last OFDM symbol of the HARQ response sent by the terminal device; a first moment being a start moment of a slot next to a slot in which the HARQ response sent by the terminal device is located; a first moment being a start moment of an OFDM symbol next to a last OFDM symbol of a PDSCH received by the terminal device; or a first moment being a start moment of a slot next to a slot in which a PDSCH received by the terminal device is located.

Optionally, the HARQ response includes an acknowledgment ACK and a negative acknowledgment NACK.

With reference to the first aspect, in another possible implementation of the first aspect, the response message includes a PUSCH. When the DCI is in the second DCI format, the first moment includes any one of the following:

a first moment being a start moment of an OFDM symbol next to a last OFDM symbol of the PUSCH sent by the terminal device; a first moment being a start moment of a slot next to a slot in which the PUSCH sent by the terminal device is located; a first moment being a start moment of an OFDM symbol next to a last OFDM symbol in OFDM symbols on which at least one aperiodic channel state information reference signal CSI-RS received by the terminal device is located when transmission of the PDCCH triggers the aperiodic CSI-RS; a first moment being a start moment of a slot next to a last slot in slots in which at least one aperiodic CSI-RS received by the terminal device is located when transmission of the PDCCH triggers the aperiodic CSI-RS; a first moment being a start moment of an OFDM symbol next to an OFDM symbol on which the PDCCH received by the terminal device is located when transmission of the PDCCH does not trigger an aperiodic CSI-RS; or a first moment being a start moment of a slot next to a slot in which the PDCCH received by the terminal device is located when transmission of the PDCCH does not trigger an aperiodic CSI-RS.

There may be one or more aperiodic CSI-RSs, and the one or more aperiodic CSI-RSs may have a plurality of functions. A function is used for channel measurement, and another function is used for interference measurement, for example, channel state information-interference measurement CSI-IM.

With reference to the first aspect, in still another possible implementation of the first aspect, the CRC bit of the DCI in the first DCI format or the second DCI format is processed through go-to-sleep cell radio network temporary identifier (GTS-C-RNTI) scrambling, and the GTS-C-RNTI scrambling is used to indicate the terminal device to enter the sleep mode at the first moment and wake up after a first GTS duration ends.

With reference to the first aspect, in still another possible implementation of the first aspect, the DCI in the first DCI format includes a first PDSCH time domain resource allocation index, the first PDSCH time domain resource allocation index is used to determine a first go-to-sleep GTS duration index in a configured PDSCH time domain resource allocation list, and the first GTS duration index is used to determine a first GTS duration for the terminal device, so that the terminal device enters the sleep mode at the first moment and wakes up after the first GTS duration ends.

Alternatively, the DCI in the second DCI format includes a first PUSCH time domain resource allocation index, the first PUSCH time domain resource allocation index is used to determine a first GTS duration index in a configured PUSCH time domain resource allocation list, and the first GTS duration index is used to determine a first GTS duration for the terminal device, so that the terminal device enters the sleep mode at the first moment and wakes up after the first GTS duration ends.

With reference to the first aspect, in still another possible implementation of the first aspect, the response message includes the HARQ response and the PUSCH. That the network device receives a response message that is sent by the terminal device based on the DCI includes: if the network device receives the HARQ response or the PUSCH sent by the terminal device, determining that the terminal device enters the sleep mode at the first moment.

Further, in another possible implementation, the method further includes: If the network device receives the NACK sent by the terminal device, the network device determines that the terminal device starts to enter a wake-up mode at a second moment, and the terminal device detects the PDCCH in the wake-up mode.

Optionally, when the DCI is in the first DCI format, the second moment includes any one of the following: a second moment being a start moment of an OFDM symbol next to a last OFDM symbol of the NACK sent by the terminal device; or a second moment being a start moment of an OFDM symbol next to a last OFDM symbol of the NACK sent by the terminal device.

With reference to the first aspect, in still another possible implementation of the first aspect, before a network device sends, by using a PDCCH, DCI with a CRC bit, wherein the DCI is in a first DCI format or a second DCI format, the method further includes: The network device sends a radio resource control RRC message, where the RRC message is used to configure the first GTS duration for the terminal device.

Further, the configuring the first GTS duration includes configuring one or more values. The configuring one value is applicable to a case in which the DCI indicates one GTS duration. The configuring a plurality of values is applicable to at least two or more GTS durations. Specifically, indication may be performed by using a GTS duration index field. For example, the network device pre-configures a plurality of GTS durations for the terminal device, and each GTS duration corresponds to one GTS duration index. Then, the network device indicates, by using the DCI that carries or is associated with a GTS duration index number, a duration in which the terminal device currently needs to sleep.

The first GTS duration is greater than or equal to 0. If the first GTS duration is equal to 0, it indicates that the terminal device does not enter the sleep mode; or if the first GTS duration is greater than 0, it indicates that the terminal device enters the sleep mode.

Optionally, if the network device does not send a configuration message, the terminal device uses a default value predefined in a protocol as the first GTS duration.

With reference to the first aspect, in still another possible implementation of the first aspect, the RRC message includes a GTS-C-RNTI, where the GTS-C-RNTI is used to indicate, during sending of the PDCCH, the terminal device to enter the sleep mode. Alternatively, the RRC message includes GTS configuration information, where the GTS configuration information includes the PDSCH time domain resource allocation list or the PUSCH time domain resource allocation list, the PDSCH time domain resource allocation list includes at least one correspondence between a PDSCH time domain resource allocation index and a first GTS duration index, the PUSCH time domain resource allocation list includes at least one correspondence between a PUSCH time domain resource allocation index and a first GTS duration index, and the first GTS duration index is used to indicate the first GTS duration.

Optionally, the RRC message used to configure the first GTS duration may alternatively be a system message or predefined in a protocol.

It should be noted that, in a manner in which the GTS-C-RNTI is used to indicate the terminal device to enter the sleep mode, if an RNTI other than the GTS-C-RNTI, for example, a C-RNTI or a CS-RNTI, is used, the terminal device does not enter the sleep mode.

According to a second aspect, an embodiment of this application further provides a message receiving method. The method includes: A terminal device detects a physical downlink control channel (PDCCH) sent by a network device. If downlink control information (DCI) that has a cyclic redundancy check (CRC) bit and that is in a first DCI format or a second DCI format is found on the PDCCH through detection, the terminal device enters a sleep mode at a first moment based on the DCI, where the first DCI format is a DCI format used to indicate a scheduling of physical downlink shared channel (PDSCH), and the second DCI format is a DCI format used to indicate a scheduling of physical uplink shared channel (PUSCH). The terminal device sends a response message to the network device based on the DCI.

With reference to the second aspect, in a possible implementation of the second aspect, the response message includes a hybrid automatic repeat request (HARQ) response. When the DCI is in the first DCI format, the first moment includes any one of the following: a first moment being a start moment of an orthogonal frequency division multiplexing (OFDM) symbol next to a last OFDM symbol of the HARQ response sent by the terminal device; a first moment being a start moment of a slot next to a slot in which the HARQ response sent by the terminal device is located; a first moment being a start moment of an OFDM symbol next to a last OFDM symbol of a PDSCH received by the terminal device; or a first moment being a start moment of a slot next to a slot in which a PDSCH received by the terminal device is located.

With reference to the second aspect, in another possible implementation of the second aspect, the response message includes a PUSCH. When the DCI is in the second DCI format, the first moment includes any one of the following:

a first moment being a start moment of an OFDM symbol next to a last OFDM symbol of the PUSCH sent by the terminal device; a first moment being a start moment of a slot next to a slot in which the PUSCH sent by the terminal device is located; a first moment being a start moment of an OFDM symbol next to a last OFDM symbol in OFDM symbols on which at least one aperiodic channel state information reference signal CSI-RS received by the terminal device is located when transmission of the PDCCH triggers the aperiodic CSI-RS; a first moment being a start moment of a slot next to a last slot in slots in which at least one aperiodic CSI-RS received by the terminal device is located when transmission of the PDCCH triggers the aperiodic CSI-RS; a first moment being a start moment of an OFDM symbol next to an OFDM symbol on which the PDCCH received by the terminal device is located when transmission of the PDCCH does not trigger an aperiodic CSI-RS; or a first moment being a start moment of a slot next to a slot in which the PDCCH received by the terminal device is located when transmission of the PDCCH does not trigger an aperiodic CSI-RS.

With reference to the second aspect, in still another possible implementation of the second aspect, that the terminal device enters a sleep mode at a first moment based on the DCI includes: if it is detected that the CRC bit of the DCI in the first DCI format or the second DCI format is processed through go-to-sleep cell radio network temporary identifier GTS-C-RNTI scrambling, determining that the terminal device enters the sleep mode at the first moment.

With reference to the second aspect, in still another possible implementation of the second aspect, that the terminal device enters a sleep mode at a first moment based on the DCI includes: When the DCI in the first DCI format includes a first PDSCH time domain resource allocation index, the terminal device determines a first go-to-sleep GTS duration index based on the first PDSCH-time domain resource allocation index and a PDSCH time domain resource allocation list, determines first GTS duration based on the first GTS duration index, and enters the sleep mode at the first moment and wakes up after the first GTS duration ends.

Alternatively, when the DCI in the second DCI format includes a first PUSCH time domain resource allocation index, the terminal device determines a first GTS duration index based on the first PUSCH time domain resource allocation index and a PUSCH time domain resource allocation list, determines first GTS duration based on the first GTS duration index, and enters the sleep mode at the first moment and wakes up after the first GTS duration ends.

With reference to the second aspect, in still another possible implementation of the second aspect, the response message includes a hybrid automatic repeat request-acknowledgement HARQ response and the PUSCH. When sending the HARQ response or the PUSCH to the network device, the terminal device enters the sleep mode at the first moment.

With reference to the second aspect, in still another possible implementation of the second aspect, before the terminal device detects the PDCCH sent by the network device, the method further includes: The terminal device receives a radio resource control RRC message from the network device, where the RRC message is used to configure the first GTS duration for the terminal device.

With reference to the second aspect, in still another possible implementation of the second aspect, the RRC message includes a GTS-C-RNTI, where the GTS-C-RNTI is used to indicate, during sending of the PDCCH, the terminal device to enter the sleep mode. Alternatively, the RRC message includes GTS configuration information, where the GTS configuration information includes the PDSCH time domain resource allocation list or the PUSCH time domain resource allocation list, the PDSCH time domain resource allocation list includes at least one correspondence between a PDSCH-time domain resource allocation index and a first GTS duration index, the PUSCH time domain resource allocation list includes at least one correspondence between a PUSCH time domain resource allocation index and a first GTS duration index, and the first GTS duration index is used to indicate the first GTS duration.

According to a third aspect, an embodiment of this application provides a communications apparatus. The apparatus is configured to implement the message sending method according to the first aspect and the implementations of the first aspect.

Optionally, the apparatus includes at least one functional unit or module. Further, the at least one functional unit is a sending unit, a processing unit, a receiving unit, or the like.

According to a fourth aspect, an embodiment of this application further provides another communications apparatus. The apparatus is configured to implement the message receiving method according to the second aspect and the implementations of the second aspect.

Optionally, the apparatus includes at least one functional unit or module. Further, the at least one functional unit is a sending unit, a processing unit, a receiving unit, or the like.

According to a fifth aspect, an embodiment of this application further provides a network device. The network device includes a processor and a memory. The processor is coupled to the memory. The memory is configured to store instructions. The processor is configured to invoke the instructions to enable the network device to perform the message sending method according to the first aspect and the implementations of the first aspect, or the processor is configured to invoke the instructions to enable the network device to perform the message receiving method according to the second aspect and the implementations of the second aspect.

Optionally, the network device further includes a transceiver, configured to receive or send a message of a peer device.

Optionally, the network device is the communications apparatus according to the third aspect or the fourth aspect.

Further, when the network device is used as the communications apparatus according to the third aspect, the network device may be a base station or an access point; or when the network device is used as the communications apparatus according to the fourth aspect, the network device may be UE, a mobile phone, or the like.

According to a sixth aspect, an embodiment of this application further provides a computer-readable storage medium. The storage medium stores instructions. When the instructions are run on a computer or a processor, the instructions are used to perform the method according to the first aspect and the implementations of the first aspect, or used to perform the method according to the second aspect and the implementations of the second aspect.

According to a seventh aspect, an embodiment of this application further provides a computer program product. The computer program product includes computer instructions. When the instructions are executed by a computer or a processor, the method according to the first aspect and the implementations of the first aspect can be implemented.

According to an eighth aspect, an embodiment of this application further provides a chip system. The chip system includes a processor and an interface circuit. The interface circuit is coupled to the processor. The processor is configured to execute computer programs or instructions, to implement the method according to the first aspect and the implementations of the first aspect, or implement the method according to the second aspect and the implementations of the second aspect. The interface circuit is configured to communicate with another module outside the chip system.

According to a ninth aspect, an embodiment of this application further provides a communications system. The communications system includes at least two communications devices. The at least two communications devices include at least one first communications apparatus and at least one second communications apparatus. The first communications apparatus may be the apparatus according to the third aspect, and is configured to implement the message sending method according to the first aspect and the implementations of the first aspect. The second communications apparatus may be the apparatus according to the fourth aspect, and is configured to implement the message receiving method according to the second aspect and the implementations of the second aspect.

According to the method provided in this embodiment, the network device transmits, by using the PDCCH, the DCI with channel coding and CRC check, so that a probability that a false alarm occurs can be reduced, thereby resolving the following problem. UE at a receive end detects a false GTS signal due to factors such as interference and noise, and enters the sleep mode. Consequently, a base station is not detected (monitored) by the UE during subsequent sending of the PDCCH.

In addition, based on the response message fed back by the terminal device, the current network device can indicate, based on the DCI, the terminal device to reach an agreement upon a behavior of PDCCH monitoring, thereby improving reliability of sending a GTS message to indicate the terminal device to enter the sleep mode. In addition, the terminal device may also enter the sleep mode based on the DCI delivered by the network device, so that a circuit used to receive a downlink message can be disabled during the GTS sleep duration, thereby reducing power consumption of the terminal device.

DESCRIPTION OF EMBODIMENTS

To make a person skilled in the art better understand technical solutions in embodiments of this application, and make the objectives, features, and advantages of the embodiments of this application clearer, the following further describes the technical solutions in the embodiments of this application in detail with reference to the accompanying drawings.

Before the technical solutions in the embodiments of this application are described, an application scenario of the embodiments of this application is firstly described with reference to the accompanying drawings.

The technical solutions of this application may be applied to a network system including a base station and a terminal device, for example, a long term evolution (LTE) system or a 5th generation (5G) mobile communications system. In addition, the technical solutions of this application may be further applied to a future network system, for example, a 6th or 7th generation mobile communications system.

Figure 1:
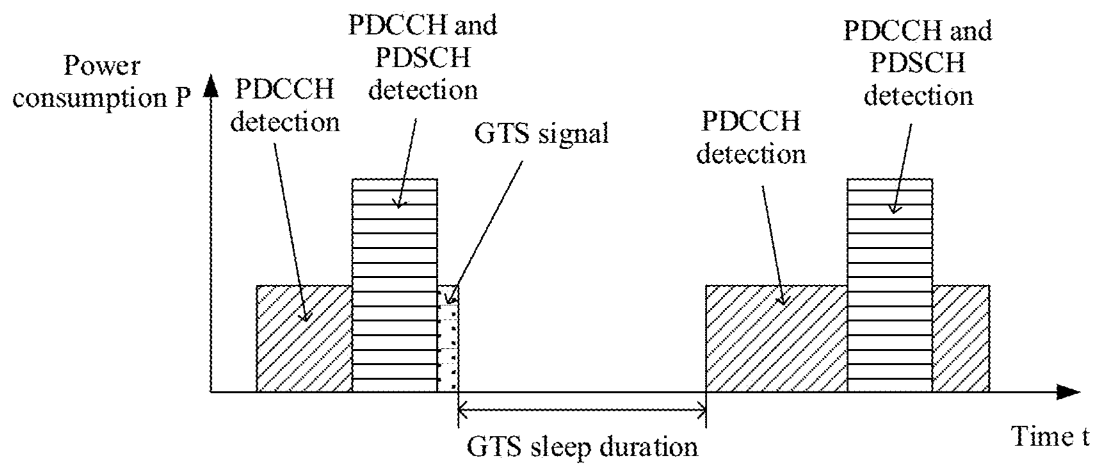
FIG. 1 is a schematic diagram in which UE receives a GTS signal and enters a sleep mode according to this application.
Figure 2:
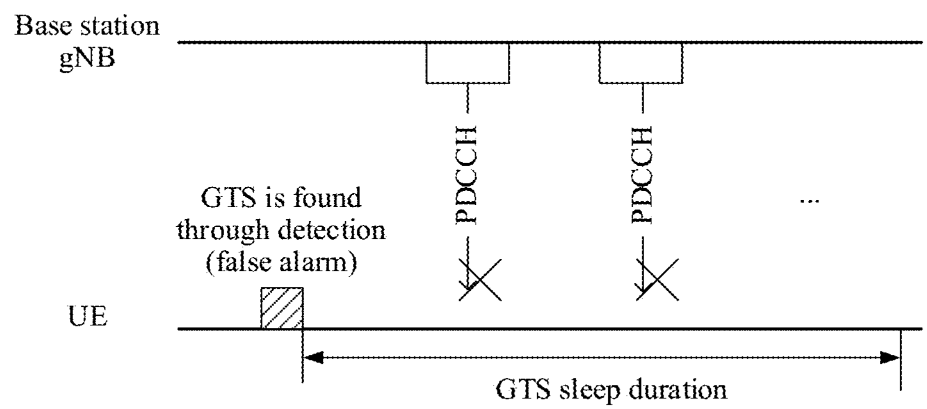
FIG. 2 is a schematic diagram in which a GTS false alarm affects PDCCH detection performed by UE according to this application.
Figure 3:
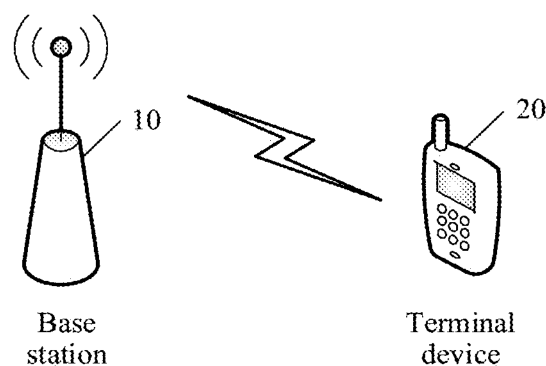
FIG. 3 is a schematic diagram of a scenario of a base station and a terminal device according to an embodiment of this application.

As shown in FIG. 3, a network system includes a network device, a base station 10, and a terminal device 20. Specifically, the network device may be the base station 10. Further, the base station may be a base transceiver station (BTS) in GSM or CDMA, a NodeB in WCDMA, an evolved NodeB (eNB/e-NodeB) in LTE, an ng-eNB, a gNB, a base station in a future mobile communications system, an access node in a Wi-Fi system, or the like. A specific technology and a specific device form used by the network device are not limited in the embodiments of this application. In this application, the network device may be a radio access network device.

The terminal device in the embodiments of this application may be a device that provides a user with voice and/or data connectivity, a handheld device with a wireless connection function, or another processing device connected to a wireless modem, for example, a wireless terminal.

The wireless terminal may communicate with one or more nodes over a radio access network RAN. The wireless terminal may be a mobile terminal such as a mobile phone (or referred to as a "cellular" phone), or a computer with a mobile terminal, for example, a portable, pocket-sized, handheld, computer built-in, or in-vehicle mobile apparatus, which exchanges voice and/or data with the radio access network. For example, the wireless terminal may be a device such as a personal communications service (PCS) phone, a cordless phone, a session initiation protocol (SIP) phone, a wireless local loop (WLL) station, or a personal digital assistant (PDA). The wireless terminal may alternatively be a subscriber unit, a subscriber station, a mobile station, a remote station, an access point, a remote terminal, an access terminal, a user terminal, a user agent, a user device, user equipment (UE), or the like. A specific technology and a specific device form used by the terminal device are not limited in the embodiments of this application.

This embodiment provides a message sending method, to resolve the following technical problem. When a base station does not send a GTS signal, but a terminal device detects a GTS signal and enters a sleep state, a physical downlink control channel (PDCCH) subsequently transmitted by the base station cannot be detected and received by the terminal device, resulting in impact on system performance.

To resolve the technical problem, in the technical solutions provided in this application, the base station preconfigures, for the terminal device by using a message, various manners in which the terminal device enters a sleep mode, then transmits downlink control information (DCI) carried by a PDCCH, to indicate the terminal device to go to sleep, and determines a current state of the terminal device based on a response message sent by the terminal device. In addition, the base station includes a cyclic redundancy check (CRC) bit in the sent DCI. This reduces a probability that a false alarm occurs and improves stability of a communications system.

Figure 4:
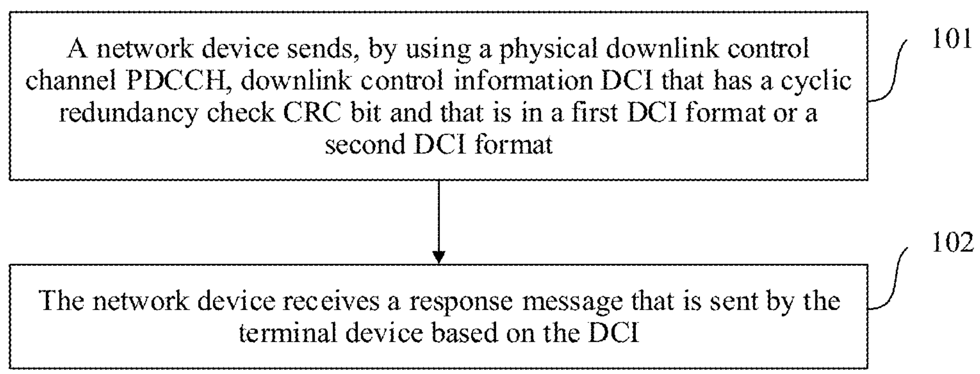
FIG. 4 is a flowchart of a message sending method according to an embodiment of this application.

Specifically, as shown in FIG. 4, this application provides a message sending method. The method includes the following steps.

Step 101: A network device sends, by using a PDCCH, DCI with a CRC bit, wherein the DCI is in a first DCI format or a second DCI format.

The DCI is used to indicate a terminal device to enter a sleep mode at a first moment, the first DCI format is a DCI format used to indicate a scheduling of PDSCH, and the second DCI format is a DCI format used to indicate a scheduling of PUSCH.

Optionally, the first DCI format includes a format 1_0 and a format 1_1, and the second DCI format includes a format 0_0 and a format 0_1.

Further, in an implementation, the CRC bit of the DCI in the first DCI format or the second DCI format is processed through GTS cell radio network temporary identifier (C-RNTI) scrambling. The GTS cell radio network temporary identifier scrambling is referred as GTS-C-RNTI scrambling for short, and the GTS-C-RNTI scrambling is used to indicate the terminal device to enter the sleep mode at the first moment.

In addition, in another implementation, the DCI in the first DCI format includes a first PDSCH time domain resource allocation index, the first PDSCH time domain resource allocation index is used to determine a first go-to-sleep GTS duration index in a configured PDSCH time domain resource allocation list, and the first GTS duration index is used to determine a first GTS duration for the terminal device, so that the terminal device enters the sleep mode at the first moment and wakes up after the first GTS duration ends.

In still another implementation, the DCI in the second DCI format includes a first PUSCH time domain resource allocation index, the first PUSCH time domain resource allocation index is used to determine a first GTS duration index in a configured PUSCH time domain resource allocation list, and the first GTS duration index is used to determine a first GTS duration for the terminal device, so that the terminal device enters the sleep mode at the first moment and wakes up after the first GTS duration ends.

Step 102: The network device receives a response message that is sent by the terminal device based on the DCI.

The response message includes a HARQ response. Further, the HARQ response includes an ACK and a NACK.

When the DCI is in the first DCI format, the first moment is any one of the following:

- a start moment of an OFDM symbol next to a last OFDM symbol of the ACK sent by the terminal device;
- a start moment of a slot next to a slot in which the ACK sent by the terminal device is located;
- a start moment of an OFDM symbol next to a last OFDM symbol of a PDSCH received by the terminal device; or
- a start moment of a slot next to a slot in which a PDSCH received by the terminal device is located.

Optionally, the response message further includes a PUSCH. When the DCI is in the second DCI format, the first moment is any one of the following:

- being a start moment of an OFDM symbol next to a last OFDM symbol of the PUSCH sent by the terminal device;
- being a start moment of a slot next to a slot in which the PUSCH sent by the terminal device is located;
- being a start moment of an OFDM symbol next to a last OFDM symbol in OFDM symbols on which at least one aperiodic CSI-RS received by the terminal device is located when transmission of the PDCCH triggers the aperiodic CSI-RS;

being a start moment of a slot next to a last slot in slots in which at least one aperiodic CSI-RS received by the terminal device is located when transmission of the PDCCH triggers the aperiodic CSI-RS;

being a start moment of an OFDM symbol next to an OFDM symbol on which the PDCCH received by the terminal device is located when transmission of the PDCCH does not trigger an aperiodic CSI-RS; or being a start moment of a slot next to a slot in which the PDCCH received by the terminal device is located when transmission of the PDCCH does not trigger an aperiodic CSI-RS.

In this embodiment, that the network device determines a sleep state of the terminal device based on the response message of the terminal device includes: if the network device receives the ACK or the PUSCH sent by the terminal device, determining that the terminal device enters the sleep mode at the first moment, where the terminal device does not perform PDCCH detection in the sleep mode.

That the terminal device does not perform PDCCH detection (or "does not perform PDCCH monitoring") in the sleep mode includes at least not performing detection of a PDCCH that carries DCI whose CRC is scrambled by using the following RNTI:

a cell RNTI (C-RNTI), a configured scheduling-RNTI (CS-RNTI), an interruption-RNTI (INT-RNTI), a slot format indicator-RNTI (SFI-RNTI), a semi-persistent channel state information RNTI (SP-CSI-RNTI), a transmission power control-PUCCH-RNTI (TPC-PUCCH-RNTI), a transmission power control-PUSCH-RNTI (TPC-PUSCH-RNTI), a transmission power control-sounding reference signal-RNTI (TPC-SRS-RNTI), a GTS-C-RNTI, and the like.

If the network device does not receive the ACK or the PUSCH, the network device determines that the terminal device does not enter the sleep mode, and may re-send the PDCCH to indicate the terminal device to sleep.

If the network device receives the NACK sent by the terminal device, the network device determines that the terminal device starts to enter a wake-up mode at a second moment, and the UE detects the PDCCH in the wake-up mode.

Specifically, when the DCI is in the first DCI format, the second moment includes any one of the following:

a second moment being a start moment of an OFDM symbol next to a last OFDM symbol of the NACK sent by the terminal device; or a second moment being a start moment of an OFDM symbol next to a last OFDM symbol of the NACK sent by the terminal device.

Optionally, before step 101, the method further includes: The network device sends an RRC message, where the RRC message is used to configure the first GTS duration for the terminal device.

Specifically, the network device may configure, by using the RRC message, content indicating the first GTS duration. For example, the first GTS duration is carried in a specific field, or the first GTS duration may be indicated by using an index. For example, a first GTS duration index is dynamically indicated by means of different DCI formats, so that the terminal device can search for a corresponding first GTS duration based on the first GTS duration index.

Specifically, in a configuration manner, the RRC message includes the GTS-C-RNTI. The GTS-C-RNTI is used to indicate, during subsequent sending of the PDCCH, the terminal device to enter the sleep mode. The first GTS duration may be indicated by using another field in the RRC message, or may be pre-agreed upon by the network device and the terminal device.

In another configuration manner, the RRC message includes GTS configuration information. The GTS configuration information includes the PDSCH time domain resource allocation list or the PUSCH time domain resource allocation list. The PDSCH time domain resource allocation list includes at least one correspondence between a PDSCH time domain resource allocation index and a first GTS duration index. The PUSCH time domain resource allocation list includes at least one correspondence between a PUSCH time domain resource allocation index and a first GTS duration index. The first GTS duration index is used to indicate the first GTS duration.

Optionally, the network device may alternatively configure a GTS duration for the terminal device by using a system message. The system message includes the GTS-C-RNTI or the GTS configuration information.

Optionally, the first GTS duration may be absolute time, for example, millisecond, or may be a quantity of slots, a quantity of OFDM symbols, a combination of a slot and an OFDM symbol, or the like. A unit and an expression form of the first GTS duration are not limited in this application.

It should be noted that the sleep mode described in this application may also be referred to as a dormant mode, a micro-sleep mode, an inactive mode, or the like. It may be understood that the GTS duration may also be understood as a dormant duration, a micro-sleep duration, a duration of being in an inactive state, or the like. This is not limited in this embodiment of this application.

According to the method provided in this embodiment, the network device transmits, by using the PDCCH, the DCI with channel coding and CRC check, so that a probability that a false alarm occurs can be reduced, thereby resolving the following problem. UE at a receive end detects a false GTS signal due to factors such as interference and noise, and enters the sleep mode. Consequently, a base station is not monitored by the UE during subsequent sending of the PDCCH.

In addition, based on the response message fed back by the terminal device, the current network device can indicate, based on the DCI, the terminal device to reach an agreement upon a behavior of PDCCH monitoring, thereby improving reliability of sending a GTS message to indicate the terminal device to enter the sleep mode. In addition, the terminal device may also enter the sleep mode based on the DCI delivered by the network device, so that a circuit used to receive a downlink message can be closed during the GTS sleep duration, thereby reducing power consumption of the terminal device.

The following describes in detail the technical solutions provided in this application with reference to a specific embodiment. In this embodiment, an example in which the network device is a base station and the terminal device is UE is used for description.

Figure 5:
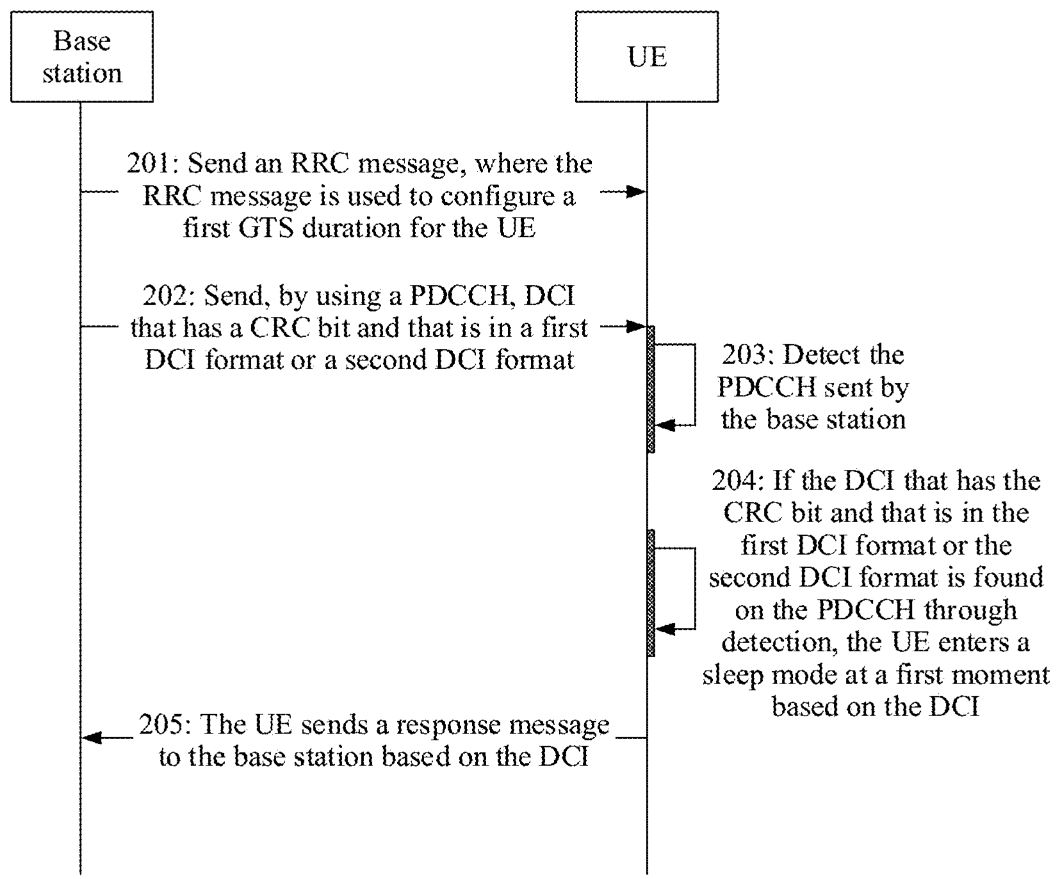
FIG. 5 is a signaling flowchart of a message sending method according to an embodiment of this application.

As shown in FIG. 5, the method provided in this embodiment includes the following steps.

Step 201: A base station sends a radio resource control (RRC) message to UE.

The RRC message is used to configure, for the UE, a first go-to-sleep (GTS) duration, or a GTS duration for short.

Correspondingly, the UE receives the RRC message sent by the base station.

Specifically, the base station may configure the GTS duration for the UE in the following three implementations.

In a first implementation, the base station indicates, by using a GTS cell radio network temporary identifier (C-RNTI), or "GTS-C-RNTI" for short, a manner of subsequently notifying the UE to enter a sleep mode. Specifically, the RRC message sent by the base station includes the GTS-C-RNTI, and the GTS-C-RNTI is used to indicate, during subsequent sending of the PDCCH, the UE to enter the sleep mode.

Optionally, in the first implementation, the base station may alternatively include the GTS-C-RNTI in an RRC information element (IE), for example, a physical cell group configuration (physical cell group config).

In addition, in this implementation, the base station may pre-agree to configure a first GTS duration for the UE, and notify the UE to use, during subsequent transmission of the PDCCH, DCI scrambled by the GTS-C-RNTI as a condition for indicating the UE to enter the sleep mode. Optionally, the first GTS duration may be specifically indicated by using the RRC message, or the base station and the UE pre-agree upon a GTS duration as the first GTS duration.

In a second implementation, the base station configures a physical downlink shared channel (PDSCH) time domain resource allocation (time domain resource assignment) parameter for the UE by using the RRC message. The parameter carries GTS configuration information.

Specifically, the RRC message includes the GTS configuration information. The GTS configuration information includes a PDSCH time domain resource allocation list (PDSCH Time Domain Resource Allocation List). The PDSCH time domain resource allocation list includes at least one correspondence between a PDSCH time domain resource allocation index and a first GTS duration index. Each PDSCH time domain resource allocation index corresponds to one first GTS duration index. The first GTS duration index is used to indicate the first GTS duration. Further, there is a first correspondence between the first GTS duration index and the first GTS duration. Therefore, the first GTS duration can be determined based on the first GTS duration index and the first correspondence.

In addition, optionally, the PDSCH time domain resource allocation list may further include:

(1) a PDSCH slot offset, which may be represented by "K0";

(2) a PDSCH mapping type (PDSCH mapping type); and (3) a start symbol and a symbol length indicator value.

TABLE 1

| PDSCH time domain resource allocation index | Slot offset K0 | PDSCH mapping type | Start symbol and symbol length indicator value | First GTS duration index GTS duration index |
|---|---|---|---|---|
| 0 | 0 | Type A | 91 | 0 |
| 1 | 0 | Type B | 53 | 2 |
| 2 | 1 | Type A | 66 | 1 |
| 3 | 1 | Type A | 66 | 0 |
| . . . | | | | . . . |

Table 1 shows a PDSCH time domain resource allocation list. The PDSCH time domain resource allocation list includes a correspondence between a PDSCH time domain resource allocation index and a first GTS duration index. In addition, the PDSCH time domain resource allocation list may further include other information, for example, a demodulation reference signal (DMRS) type. This is not limited in this embodiment.

Optionally, the base station may further include the PDSCH time domain resource allocation list in an RRC information element, for example, an RRC information element in PDSCH-config or PDSCH-config common, to configure, for the UE, a first GTS duration that may be used. The first GTS duration is greater than or equal to 0.

Table 2 shows a correspondence (first correspondence) between a first GTS duration index and a first GTS duration. Each GTS duration index number corresponds to one GTS duration. For example, when the first GTS duration index is 1, a correspondingly indicated first GTS duration is 1 millisecond (ms). Optionally, when the first GTS duration index is 0, a correspondingly indicated first GTS duration is 0, indicating that the UE does not enter the sleep mode. The UE is indicated to enter the sleep mode only when the first GTS duration is greater than 0.

TABLE 2

| First GTS duration index | First GTS duration |
|---|---|
| 0 | 0 |
| 1 | 1 ms |
| 2 | 2 ms |
| 3 | 4 ms |
| . . . | . . . |

Optionally, the first GTS duration may be absolute time, for example, millisecond, or may be a quantity of slots, a quantity of OFDM symbols, a combination of a slot and an OFDM symbol, or the like. A unit and an expression form of the first GTS duration are not limited in this embodiment.

In a third implementation, similar to the second implementation, the base station configures a physical uplink shared channel (PUSCH) time domain resource allocation parameter for the UE by using the RRC message. The parameter carries GTS configuration information.

Specifically, the GTS configuration information includes a PUSCH time domain resource allocation list (PUSCH Time Domain Resource Allocation List). The PUSCH time domain resource allocation list includes a correspondence between at least one PUSCH time domain resource allocation index and a first GTS duration index. Each PUSCH time domain resource allocation index corresponds to one first GTS duration index. The first GTS duration index is used to indicate the first GTS duration. Further, there is a second correspondence between the first GTS duration index and the first GTS duration. Therefore, the first GTS duration can be determined based on the first GTS duration index and the second correspondence. The second correspondence may be a relationship shown in Table 2, or may be another correspondence.

In addition, optionally, the PUSCH time domain resource allocation list may further include information such as a PUSCH slot offset K2, a PUSCH mapping type, and a start symbol and a symbol length indicator value.

TABLE 3

| PUSCH time domain resource allocation index | Slot offset K2 | Mapping type | Start symbol and symbol length indicator value | First GTS duration index (GTS duration index) |
|---|---|---|---|---|
| 0 | 1 | Type A | 66 | 0 |
| 1 | 2 | Type A | 66 | 1 |
| 2 | 1 | Type B | 53 | 2 |
| 3 | 2 | Type A | 91 | 0 |

TABLE 3-continued

| PUSCH time domain resource allocation index | Slot offset K2 | Mapping type | Start symbol and symbol length indicator value | First GTS duration index (GTS duration index) |
|---|---|---|---|---|
| . . . | | | | . . . |

Table 3 shows a PUSCH time domain resource allocation list. The PUSCH time domain resource allocation list includes a correspondence between a PUSCH time domain resource allocation index and a first GTS duration index. In addition, the PUSCH time domain resource allocation list may further include other information, for example, a DMRS type. This is not limited in this embodiment.

Optionally, the base station may further include the PUSCH time domain resource allocation list in an RRC information element, for example, an RRC information element in PUSCH-config or PUSCH-config common, to configure, for the UE, a first GTS duration that may be used. The first GTS duration is greater than or equal to 0.

In step 201, the base station configures, for the UE in three semi-static manners, the GTS duration in which the UE may enter a sleep state, to perform dynamic indication when the UE needs to enter the sleep state subsequently.

It should be noted that, in the three manners of configuring the GTS duration provided in this embodiment, the first implementation is used to configure one GTS duration for the UE, and the second and third implementations may be used to configure at least one GTS duration for the UE. In addition, the first configuration manner, the second configuration manner, and the third configuration manner are in a parallel relationship.

Step 202: The base station sends, by using the PDCCH, DCI with a CRC bit, wherein that the DCI is in a first DCI format or a second DCI format.

The DCI is used to indicate the UE to enter the sleep mode at a first moment, the first DCI format is a DCI format used to indicate the scheduling of PDSCH, and the second DCI format is a DCI format used to indicate the scheduling of PUSCH.

In this embodiment, the DCI format includes at least one of a DCI format 0_0, a format 0_1, a format 1_0, or a format 1_1. Further, the first DCI format includes the format 1_0 and the format 1_1, wherein the first DCI format is used to deliver a GTS message by a PDCCH indicating the scheduling of PDSCH, and the second DCI format includes the format 0_0 and the format 0_1, wherein the second DCI format is used to deliver a GTS message by a PDCCH indicating a scheduling of PUSCH.

The CRC bit of the DCI in the first DCI format or the second DCI format is processed through GTS-C-RNTI scrambling, and the GTS-C-RNTI scrambling is used to indicate the UE to enter the sleep mode at the first moment. Optionally, the CRC bit, of the DCI, processed through the GTS-C-RNTI scrambling may be used as a specific manner of the first implementation in step 101, to indicate the GTS duration of the UE.

It should be noted that, in this embodiment, the DCI whose CRC bit is processed through the GTS-C-RNTI scrambling includes but is not limited to the DCI in the first DCI format and the DCI in the second DCI format. Alternatively, DCI in another format may be scrambled. This is not limited in this application.

In the first implementation, the base station sends, by using the PDCCH, the DCI whose CRC bit is processed through the GTS-C-RNTI scrambling, to indicate the UE to enter the sleep mode. If the base station scrambles the CRC bit by using an RNTI other than the GTS-C-RNTI (for example, a CRC scrambling identifier of a C-RNTI, an INT-RNTI, or a CS-RNTI), and sends the corresponding PDCCH to the UE, it indicates that the base station does not indicate the UE to enter the sleep mode.

In addition, when detecting the DCI of the GTS-C-RNTI, the UE may enter the sleep mode based on the first GTS duration agreed upon by the UE and the base station, and wake up after the first GTS duration ends.

In the second implementation, the base station indicates, by using a PDSCH time domain resource allocation field in the first DCI format, a specific GTS duration for the UE to go to sleep.

Specifically, the PDSCH time domain resource allocation field in the first DCI format includes the first PDSCH time domain resource allocation index. The first PDSCH time domain resource allocation index is used to determine the first GTS duration index in the configured PDSCH time domain resource allocation list. Then, the UE determines the first GTS duration based on the first GTS duration index, so that the UE enters the sleep mode at the first moment and wakes up after the first GTS duration ends.

Optionally, the first DCI format is the format 1_0 or the format 1_1.

Optionally, if the base station does not configure the PDSCH-Config or the PDSCH-Config Common for the UE, the base station determines the first GTS duration based on a default PDSCH time domain resource allocation list predefined in a protocol. For example, Table 4 is a default PDSCH time domain resource allocation list pre-agreed upon by the base station and the UE.

TABLE 4

| Index row index | Position of a type A of a DMRS DMRS-TypeA-Position | Mapping type mapping type | Slot offset K0 | Start symbol S | Symbol length value L | GTS duration index |
|---|---|---|---|---|---|---|
| 1 | 2 | Type A | 0 | 2 | 12 | 0 |
| | 3 | Type A | 0 | 3 | 11 | 2 |
| 2 | 2 | Type A | 0 | 2 | 10 | 1 |
| | 3 | Type A | 0 | 3 | 9 | 0 |
| 3 | 2 | Type A | 0 | 2 | 9 | . . . |
| | 3 | Type A | 0 | 3 | 8 | |
| 4 | 2 | Type A | 0 | 2 | 7 | |
| | 3 | Type A | 0 | 3 | 6 | |
| 5 | 2 | Type A | 0 | 2 | 5 | |
| | 3 | Type A | 0 | 3 | 4 | |
| 6 | 2 | Type B | 0 | 9 | 4 | |
| | 3 | Type B | 0 | 10 | 4 | |
| 7 | 2 | Type B | 0 | 4 | 4 | |
| | 3 | Type B | 0 | 6 | 4 | |
| 8 | 2 and 3 | Type B | 0 | 5 | 7 | |
| 9 | 2 and 3 | Type B | 0 | 5 | 2 | |
| 10 | 2 and 3 | Type B | 0 | 9 | 2 | |
| 11 | 2 and 3 | Type B | 0 | 12 | 2 | |
| 12 | 2 and 3 | Type A | 0 | 1 | 13 | |
| 13 | 2 and 3 | Type A | 0 | 1 | 6 | |
| 14 | 2 and 3 | Type A | 0 | 2 | 4 | |
| 15 | 2 and 3 | Type B | 0 | 4 | 7 | |
| 16 | 2 and 3 | Type B | 0 | 8 | 4 | |

Table 4 shows a default PDSCH time domain resource allocation table A for a normal cyclic prefix. Specifically, the base station indicates, based on a PDSCH time domain resource allocation field in the DCI format 1_0 or the format 1_1, to determine the first GTS duration in the correspondence in Table 3.

It may be understood that, in addition to a default correspondence shown in Table 4, other correspondences, for example, a default PDSCH time domain resource allocation table B and a default PDSCH time domain resource allocation table C, may be further included. This is not limited in this embodiment of this application.

In the third implementation, the base station indicates, by using a PUSCH time domain resource allocation field in the second DCI format, a specific GTS duration for the UE to go to sleep.

Specifically, the PUSCH time domain resource allocation field in the second DCI format includes the first PUSCH time domain resource allocation index. The first PUSCH time domain resource allocation index is used to determine the first GTS duration index in the configured PUSCH time domain resource allocation list. Then, the UE determines the first GTS duration based on the first GTS duration index, so that the UE enters the sleep mode at the first moment and wakes up after the first GTS duration ends.

Optionally, the second DCI format is the format 0_0 or the format 0_1.

As shown in FIG. 5, the method further includes the following steps. Step 203: The UE detects the PDCCH sent by the base station.

Specifically, the UE detects, on the PDCCH, whether the DCI with the CRC bit exists, and determines, based on the detected DCI, whether the UE needs to enter the sleep mode, wherein the DCI is in the first DCI format or the second DCI format.

Step 204: If the DCI with the CRC bit is detected on the PDCCH, the UE enters the sleep mode at the first moment based on the DCI, wherein the DCI is in the first DCI format or the second DCI format.

The first DCI format is the DCI format used to indicate the scheduling of PDSCH scheduling, and the second DCI format is the DCI format used to indicate the scheduling of PUSCH.

Specifically, corresponding to the first implementation, the UE detects whether the CRC bit of the DCI is processed through the GTS-C-RNTI scrambling. If the CRC bit of the DCI is processed through the GTS-C-RNTI scrambling, it is determined that the UE enters the sleep mode at the first moment. The UE does not perform PDCCH detection in the sleep mode, but may send a response message. Specifically, the UE may sleep based on a GTS duration pre-agreed upon by the UE and the base station.

Further, after the UE receives the DCI, descrambles CRC by using the GTS-C-RNTI, and successfully passes CRC check, it indicates that the base station indicates the UE to enter the sleep mode, which is equivalent to that the base station delivers a GTS signal.

On the contrary, if the DCI is not scrambled by using the GTS-C-RNTI, or is scrambled by using an RNTI in another form, the UE does not enter the sleep mode.

Optionally, corresponding to the second implementation, that the UE enters the sleep mode at the first moment based on the DCI includes: If the DCI is in the first DCI format (one of the format 1_0 or the format 1_1), the UE sleeps based on a GTS duration corresponding to the PDSCH time domain resource allocation field.

Specifically, when the DCI in the first DCI format includes the first PDSCH time domain resource allocation index, the UE determines the first go-to-sleep GTS duration index based on the first PDSCH time domain resource allocation index and the PDSCH time domain resource allocation list, determines the first GTS duration based on the first GTS duration index, and enters the sleep mode at the first moment and wakes up after the first GTS duration ends.

Optionally, corresponding to the third implementation, that the UE enters the sleep mode at the first moment based on the DCI includes: If the DCI is in the second DCI format (one of the format 0_0 or the format 0_1), the UE sleeps based on a GTS duration corresponding to the PUSCH time domain resource allocation field.

Specifically, when the DCI in the second DCI format includes the first PUSCH time domain resource allocation index, the UE determines the first GTS duration index based on the first PUSCH time domain resource allocation index and the PUSCH time domain resource allocation list, determines the first GTS duration based on the first GTS duration index, and enters the sleep mode at the first moment and wakes up after the first GTS duration ends.

It should be noted that, for the second implementation and the third implementation, the base station configures a plurality of GTS durations for the UE by using a time domain resource allocation table, where the first GTS duration may be equal to 0 or greater than 0. When the UE determines, based on a time domain resource allocation index carried in the DCI, that the first GTS duration is equal to 0, the UE is indicated not to sleep because the GTS duration is equal to 0. If the GTS duration is greater than 0, the UE is indicated to go to sleep.

Step 205: The UE sends the response message to the base station based on the DCI.

Correspondingly, the base station receives the response message sent by the UE based on the DCI.

The response message includes a hybrid automatic repeat request (HARQ)-acknowledge (ACK), a HARQ-negative acknowledge (NACK), and a PUSCH.

Specifically, a process in which the UE enters the sleep mode at the first moment based on content of the DCI and feeds back the response message to the base station is specifically as follows:

(1) When the DCI is in the first DCI format, the first moment includes the following implementations.

Figure 6A:
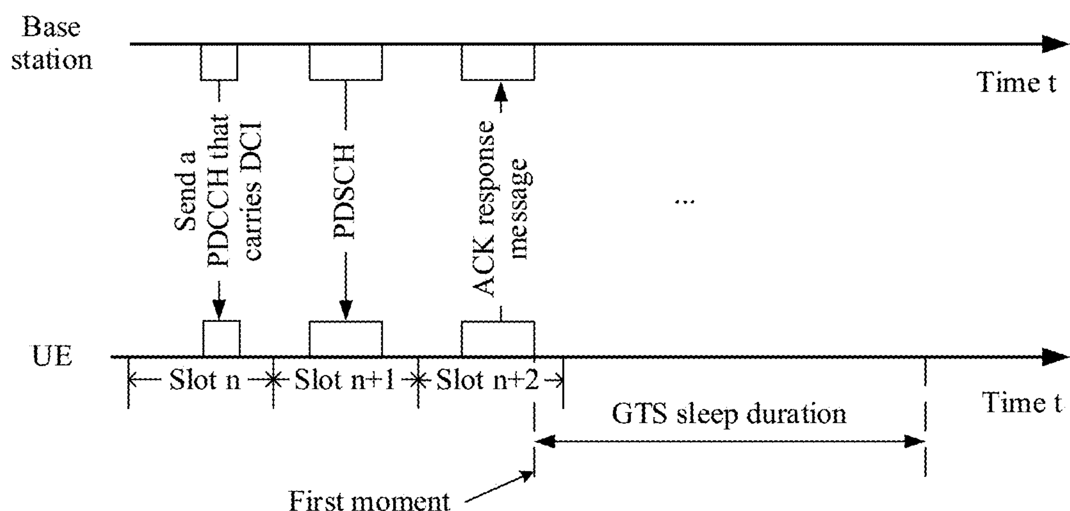
FIG. 6*a* is a schematic diagram in which UE enters a sleep mode at a first moment according to an embodiment of this application.

As shown in FIG. 6*a*, in a possible implementation, the first moment is a start moment of an OFDM symbol next to a last orthogonal frequency division multiplexing (OFDM) symbol of the ACK sent by the UE.

Specifically, after receiving the DCI that is in the first DCI format and that is transmitted by using the PDCCH, the UE starts to enter the sleep mode on the symbol next to the last OFDM symbol of the ACK fed back by the UE. In this embodiment, the first moment is the last OFDM symbol on which sending of the ACK is completed in a slot n+2.

In a new radio (NR) system, an OFDM waveform having a cyclic prefix (CP) is used in downlink transmission. In uplink transmission, a DFT-precoding-based OFDM waveform having a CP may be used, or an OFDM waveform having a CP that is the same as that used in downlink transmission may be used. In uplink/downlink transmission, a duration of one frame is fixed to 10 ms, and each frame includes 10 subframes, that is, each subframe is fixed to 1 ms. In addition, each frame is divided into two half-frames (5 ms). Each subframe includes several slots (slot), and each slot fixedly includes 14 OFDM symbols (where if an extended CP is used, each slot corresponds to 12 OFDM symbols). Therefore, in this embodiment of this application, a duration of one OFDM symbol is $\frac{1}{14}$ of a length of one slot.

Optionally, a length of two or more OFDM symbols may be required by the UE to send the ACK response message to the base station in the slot n+2. Therefore, the UE starts to enter the sleep mode on an OFDM symbol next to an OFDM symbol on which all the ACKs are sent, that is, at the first moment, sleeps based on the first GTS duration determined in step 205, and does not perform PDCCH detection until the first GTS duration ends.

Optionally, if the UE feeds back the NACK, the base station determines that the UE does not enter the sleep mode. In a possible case, the UE enters the sleep mode before feeding back the NACK. In this case, the base station determines that the UE starts to enter a wake-up mode at a second moment, and the UE detects the PDCCH in the wake-up mode.

Figure 6B:
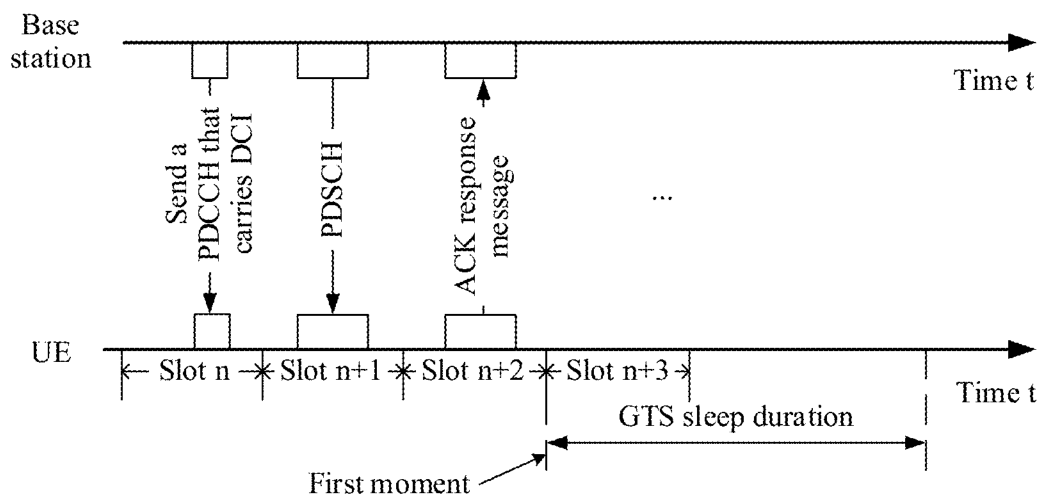
FIG. 6*b* is another schematic diagram in which UE enters a sleep mode at a first moment according to an embodiment of this application.

As shown in FIG. 6*b*, in another possible implementation, the first moment is a start moment of a slot next to a slot in which the ACK sent by the UE is located.

Specifically, the UE completes sending of the ACK response message in a duration of one or more OFDM symbols in a slot n+2. In this case, the UE starts to enter the sleep mode in a slot n+3 next to the slot n+2 in which the response message is sent, and wakes up after the GTS sleep duration ends.

Figure 6C:
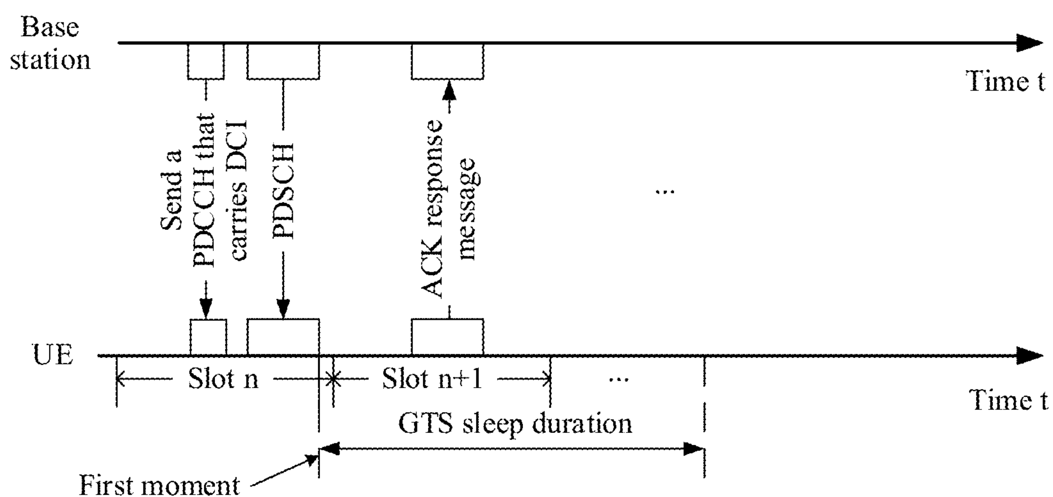
FIG. 6*c* is still another schematic diagram in which UE enters a sleep mode at a first moment according to an embodiment of this application.

As shown in FIG. 6*c*, in still another possible implementation, the first moment is a start moment of an OFDM symbol next to a last OFDM symbol of the PDSCH received by the UE.

Specifically, after receiving the PDCCH that carries the first DCI format indicating the scheduling of PDSCH, the UE starts to enter the sleep mode on the OFDM symbol next to the last OFDM symbol on which receiving of the PDSCH is completed. For example, the UE starts to sleep from the OFDM symbol next to the last OFDM symbol on which receiving of the PDSCH is completed in a slot n, and wakes up after the GTS sleep duration ends. The UE at least does not perform PDCCH detection during the GTS sleep duration, but may still send the ACK response message.

Optionally, if the response message fed back by the UE is the NACK, the UE continues to monitor the PDCCH from an OFDM symbol next to a last OFDM symbol on which the NACK is sent.

Figure 6D:
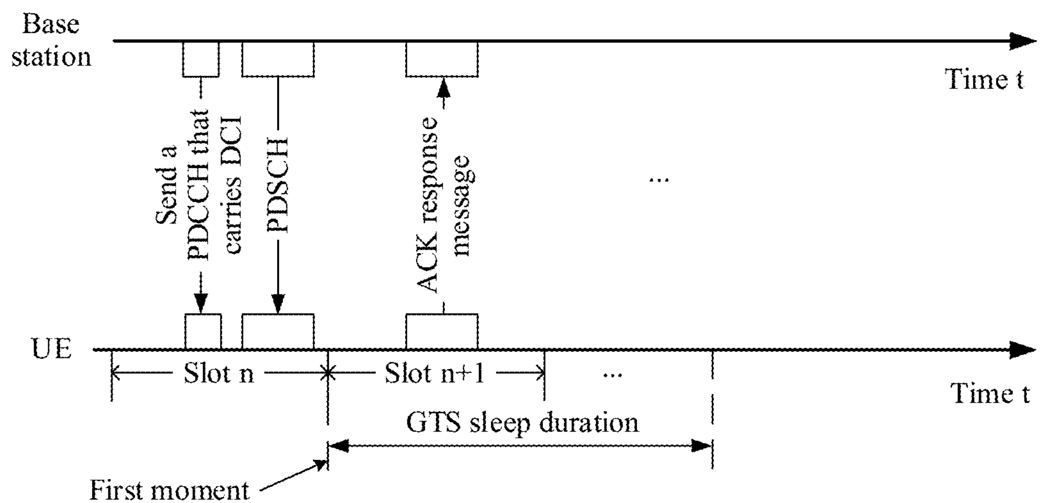
FIG. 6*d* is still another schematic diagram in which UE enters a sleep mode at a first moment according to an embodiment of this application.

As shown in FIG. 6*d*, in still another possible implementation, the first moment is a start moment of a slot next to a slot in which a PDSCH received by the terminal device is located.

Specifically, after receiving the PDCCH that carries the first DCI format indicating the scheduling of PDSCH, the UE starts to enter the sleep mode in the slot next to the slot in which receiving of the PDSCH is completed. For example, the UE starts to sleep from a slot n+1 next to a slot n in which receiving of the PDSCH is completed, and wakes up after the GTS sleep duration ends. The UE at least does not perform PDCCH detection during the GTS sleep duration, but may still send the ACK response message.

(2) When the DCI is in the second DCI format, the first moment includes the following implementations.

Figure 6E:
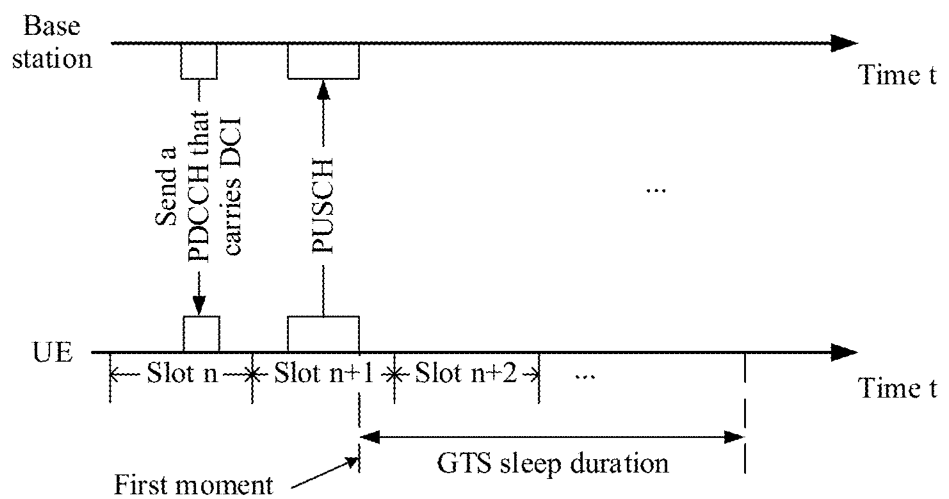
FIG. 6*e* is still another schematic diagram in which UE enters a sleep mode at a first moment according to an embodiment of this application.

As shown in FIG. 6*e*, in a possible implementation, the first moment is a start moment of an OFDM symbol next to a last OFDM symbol of the PUSCH sent by the UE.

Specifically, after receiving the PDCCH that carries the second DCI format indicating the scheduling of PUSCH, the UE starts to enter the sleep mode on the OFDM symbol next to the last OFDM symbol on which the UE completes sending of the PUSCH. For example, the UE starts to sleep from the OFDM symbol next to the last OFDM symbol on which sending of the PDSCH is completed in a slot n+1, and wakes up after the GTS sleep duration ends.

Optionally, the GTS sleep duration is the first GTS duration, and the first GTS duration is greater than or equal to 0.

Figure 6F:
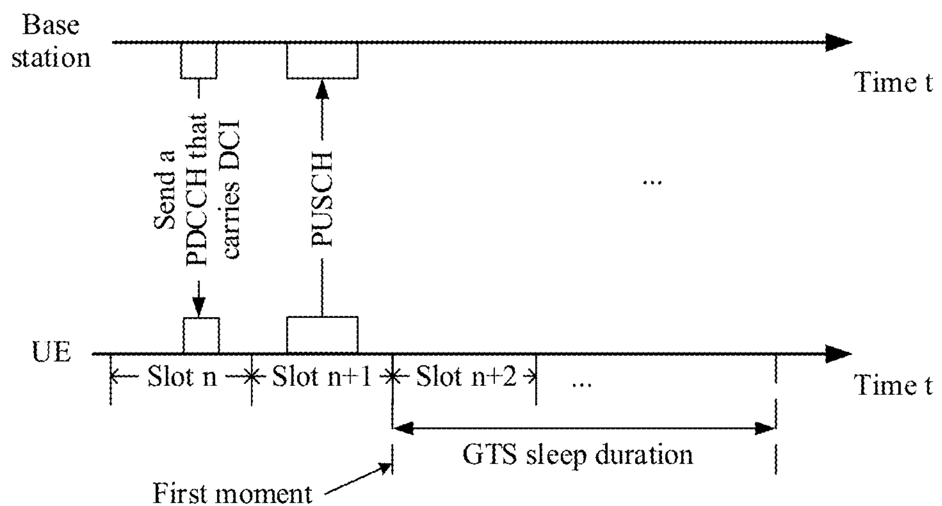
FIG. 6*f* is still another schematic diagram in which UE enters a sleep mode at a first moment according to an embodiment of this application.

As shown in FIG. 6*f*, in another possible implementation, the first moment is a start moment of a slot next to a slot in which the PUSCH sent by the UE is located.

Specifically, after receiving the PDCCH that carries the second DCI format indicating the scheduling of PUSCH, the UE starts to sleep from a slot n+2 next to a slot n+1 in which the UE completes sending of the PUSCH, and wakes up after the GTS sleep duration ends.

Figure 6G:
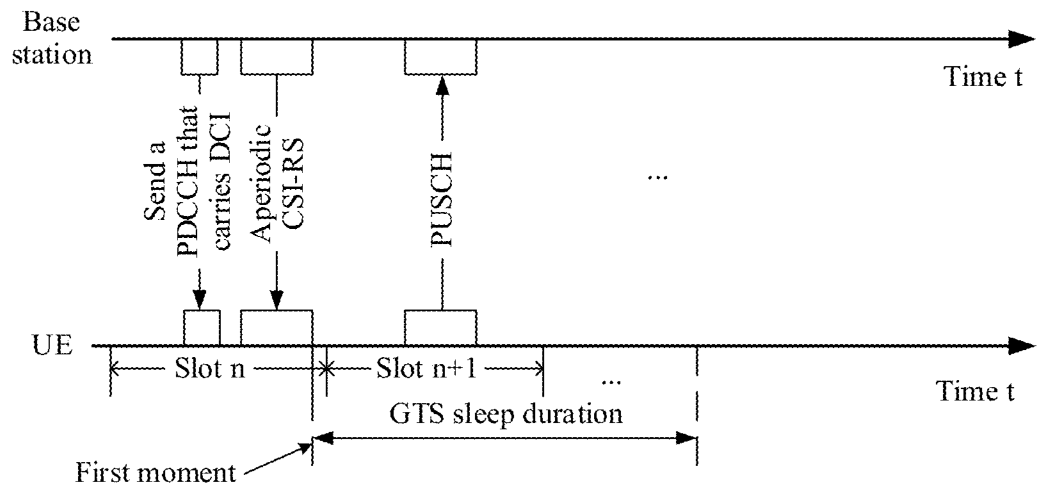
FIG. 6*g* is still another schematic diagram in which UE enters a sleep mode at a first moment according to an embodiment of this application.

As shown in FIG. 6*g*, in another possible implementation, the first moment is a start moment of an OFDM symbol next to a last OFDM symbol in OFDM symbols on which at least one aperiodic channel state information reference signal (CSI-RS) received by the UE is located when transmission of the PDCCH triggers the aperiodic CSI-RS.

Channel State Information (CSI).

Specifically, after the UE receives the PDCCH that carries the second DCI format indicating the PUSCH scheduling, if the PDCCH indicating the PUSCH scheduling triggers aperiodic CSI-RS measurement, the UE starts to sleep from an OFDM symbol next to a last OFDM symbol on which receiving of a last aperiodic CSI-RS that needs to be measured by the UE and that is triggered by the PDCCH is completed, and wakes up after the GTS sleep duration ends.

Figure 6H:
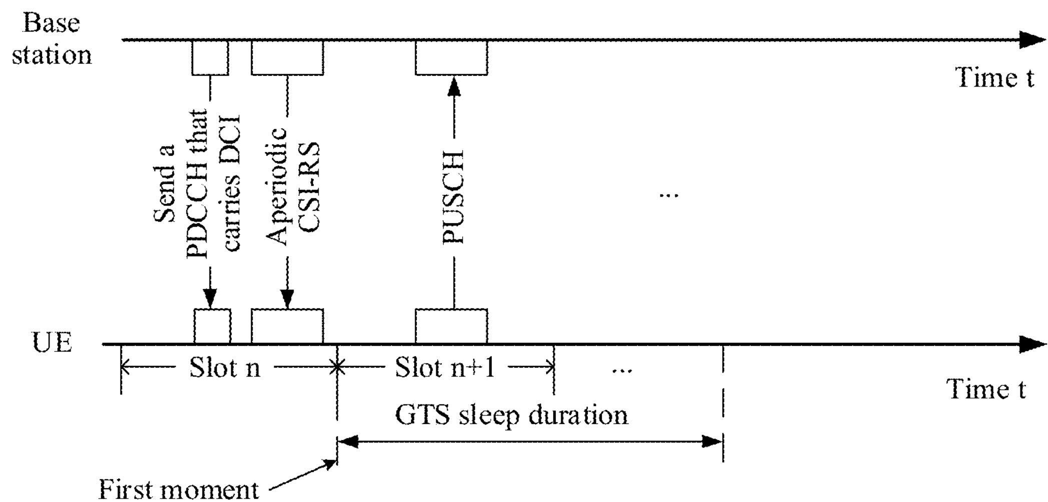
FIG. 6*h* is still another schematic diagram in which UE enters a sleep mode at a first moment according to an embodiment of this application.

As shown in FIG. 6*h*, in still another possible implementation, the first moment is a start moment of a slot next to a last slot in slots in which at least one aperiodic CSI-RS received by the UE is located when transmission of the PDCCH triggers the aperiodic CSI-RS.

Specifically, after the UE receives the PDCCH that carries the second DCI format indicating the scheduling of PUSCH, if the PDCCH indicating the scheduling of PUSCH triggers aperiodic CSI-RS measurement, the UE starts to enter the sleep mode in a slot next to a slot in which receiving of a last aperiodic CSI-RS that needs to be measured by the UE and that is triggered by the PDCCH is completed, and wakes up after the GTS sleep duration ends. The UE does not perform PDCCH detection during the GTS sleep duration.

Figure 6I:
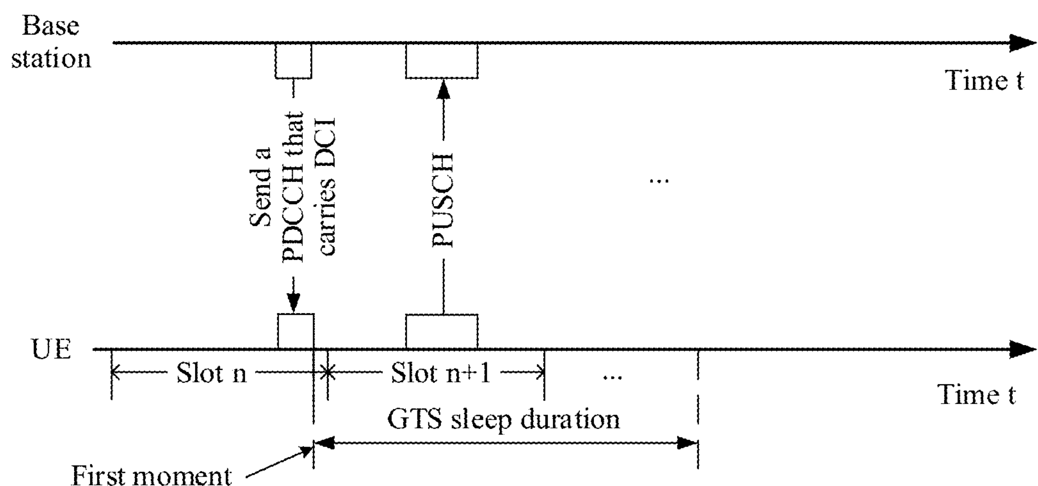
FIG. 6*i* is still another schematic diagram in which UE enters a sleep mode at a first moment according to an embodiment of this application.

As shown in FIG. 6*i*, in still another possible implementation, the first moment is a start moment of an OFDM symbol next to an OFDM symbol on which the PDCCH received by the UE is located when transmission of the PDCCH does not trigger an aperiodic CSI-RS.

Specifically, after the UE receives the PDCCH that carries the second DCI format indicating the scheduling of PUSCH, if the PDCCH indicating the scheduling of PUSCH does not trigger aperiodic CSI-RS measurement, the UE starts to sleep from an OFDM symbol next to a last OFDM symbol on which receiving of the PDCCH is completed, and wakes up after the GTS sleep duration ends.

Figure 6J:
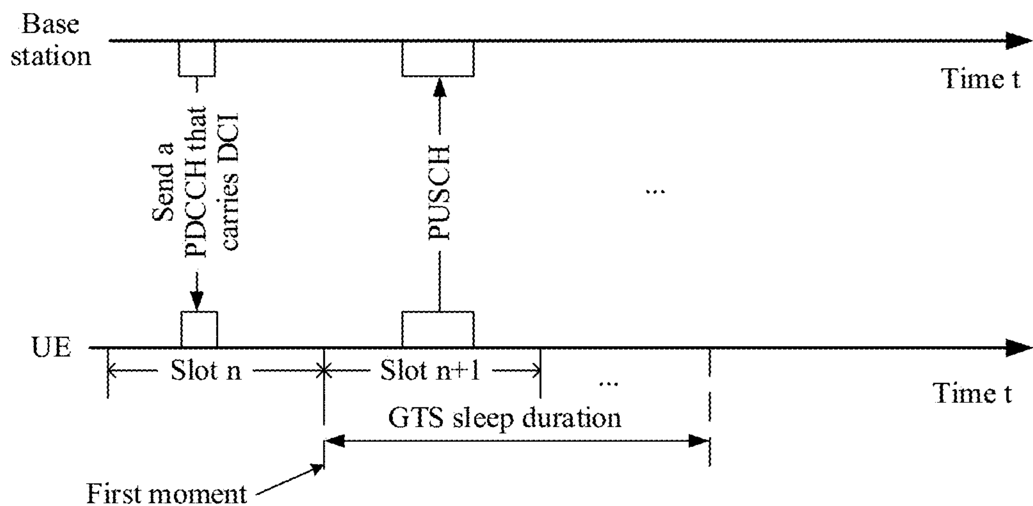
FIG. 6*j* is still another schematic diagram in which UE enters a sleep mode at a first moment according to an embodiment of this application.

As shown in FIG. 6*j*, in still another possible implementation, the first moment is a start moment of a slot next to a slot in which the PDCCH received by the UE is located when transmission of the PDCCH does not trigger an aperiodic CSI-RS.

Specifically, after the UE receives the PDCCH that carries the second DCI format indicating the scheduling of PUSCH, if the PDCCH indicating the scheduling of PUSCH does not trigger aperiodic CSI-RS measurement, the UE starts to enter the sleep mode in a slot n+1 next to a slot n in which receiving of the PDCCH is completed, and wakes up after the GTS sleep duration ends.

According to the method provided in this embodiment, the base station transmits, by using the PDCCH, the DCI with channel coding and CRC check, so that a probability that a false alarm occurs can be reduced, thereby resolving the following problem. UE at a receive end detects a false GTS signal due to factors such as interference and noise, and enters the sleep mode. Consequently, the base station is not monitored by the UE during subsequent sending of the PDCCH.

In addition, the first moment in the foregoing various implementations, namely, the start moment at which the UE enters the sleep mode, may be used to resolve a problem of a GTS missed alarm. The GTS missed alarm (or referred to as missed detection) means that a base station at a transmit end sends a GTS signal, but the UE at the receive end does not detect the GTS signal. Consequently, the UE continues to perform PDCCH monitoring, resulting in an increase in power consumption during detection of the UE.

In addition, in this embodiment, the UE enters the sleep mode at the first moment based on an indication of the DCI, and feeds back the response message to the base station. Specifically, on one hand, for the PDCCH that carries the first DCI format indicating the scheduling of PDSCH, according to the ACK or the NACK fed back by the UE, the base station and the UE agree upon a behavior that is indicated by the GTS signal and that is of PDCCH detection performed by the UE within the GTS sleep duration.

Figure 7A:
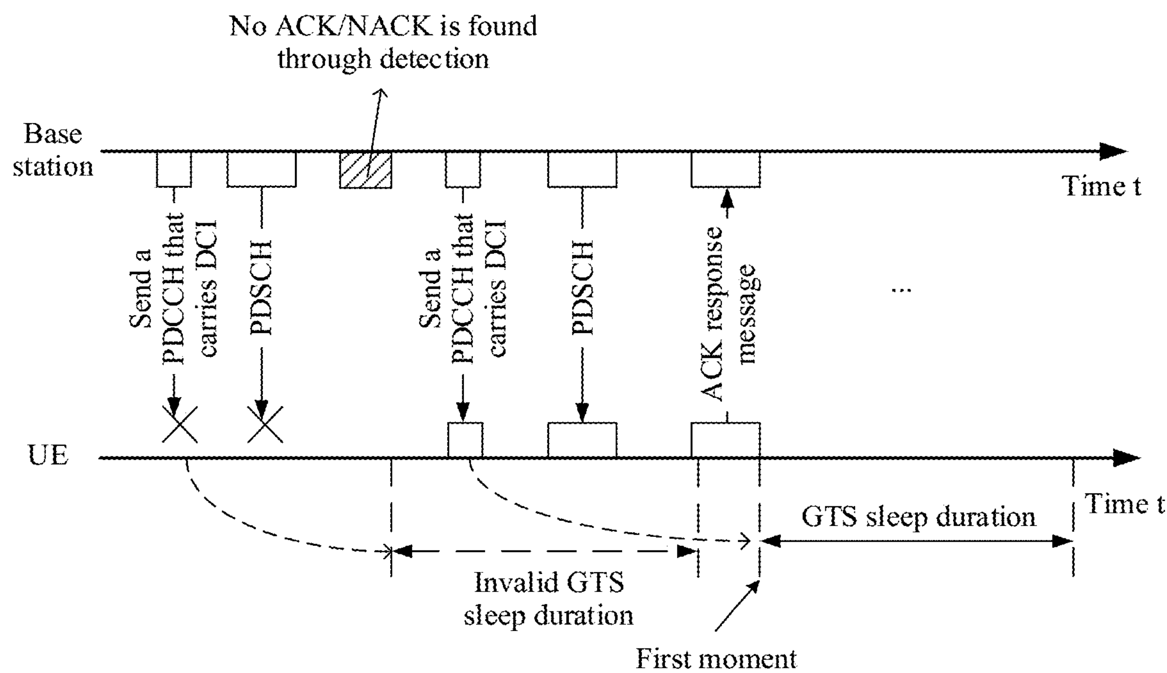
FIG. 7*a* is a schematic diagram in which a base station indicates, when a missed alarm occurs, UE to enter a sleep mode according to an embodiment of this application.

Specifically, as shown in FIG. 7*a*, if the GTS missed alarm occurs on the UE, that is, no PDCCH is found through detection, the UE does not feed back the HARQ response message to the base station. Therefore, the base station cannot receive the HARQ response message fed back by the UE, so that the base station can determine that the UE does not receive the GTS signal sent by the UE, that is, a missed alarm occurs on the UE. In this way, the base station can quickly re-send a PDCCH indicating a scheduling of PDSCH, to indicate the UE to enter the sleep mode. Therefore, a problem that power consumption increases due to the GTS missed alarm on the UE is resolved. After finding the PDCCH through detection again, the UE enters the sleep mode at the first moment based on the first DCI format carried in the PDCCH, thereby reducing power consumption of the UE.

On the other hand, for the PDCCH that carries the second DCI format indicating the scheduling of PUSCH, after receiving the DCI that is sent by the base station and that indicates the UE to enter the sleep mode, the UE may disable a downlink receiving related module or circuit during the GTS sleep duration, thereby reducing power consumption.

Figure 7B:
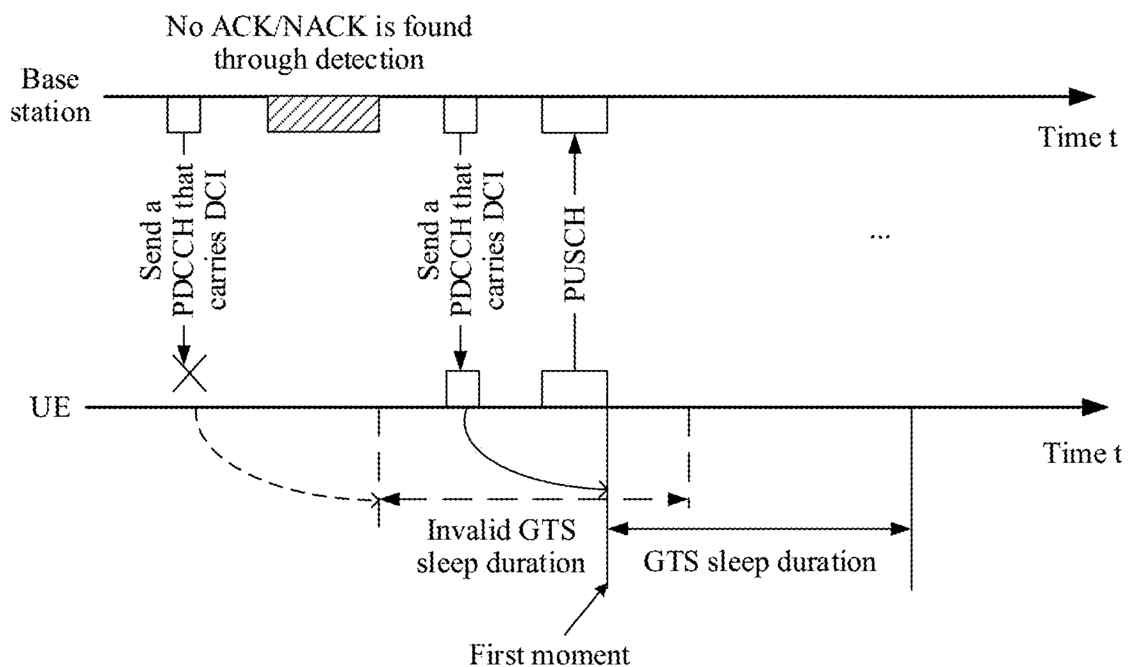
FIG. 7*b* is another schematic diagram in which a base station indicates, when a missed alarm occurs, UE to enter a sleep mode according to an embodiment of this application.

Specifically, as shown in FIG. 7*b*, if the GTS missed alarm occurs on the UE, that is, no PDCCH is found through detection, the UE does not send the PUSCH to the base station. Therefore, when the base station does not find, through detection, the PUSCH sent by the UE, the base station considers that the UE does not receive the GTS signal, that is, the UE does not enter the sleep mode, resulting in a missed alarm. Therefore, the base station may quickly re-send a PDCCH indicating scheduling of PUSCH, to indicate the UE to enter the sleep mode, thereby saving power consumption of the UE.

The following describes an apparatus embodiment corresponding to the foregoing method embodiments.

Figure 8:
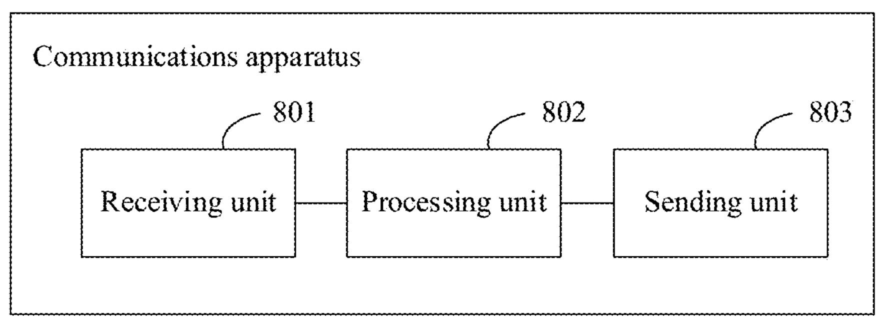
FIG. 8 is a schematic structural diagram of a communications apparatus according to an embodiment of this application.

FIG. 8 is a schematic structural diagram of a communications apparatus according to an embodiment of this application. The communications apparatus may be a message sending apparatus, a network device, or a component that can be used for a network device. Alternatively, the communications apparatus may be a message receiving apparatus, for example, a terminal device, or a component (for example, a chip) that can be used for a terminal device. Further, the communications apparatus may implement a function or an operation of the network device in the foregoing embodiments, or a function or an operation of the terminal device in the foregoing embodiments.

As shown in FIG. 8, the communications apparatus may include a receiving unit 801, a processing unit 802, and a sending unit 803. Optionally, the communications apparatus may further include a storage unit or another unit or module.

When the communications apparatus is configured to send a message, the sending unit 803 is configured to send, by using a PDCCH, downlink control information DCI with a CRC bit, wherein the DCI is in a first DCI format or a second DCI format, and the receiving unit 801 is configured to receive a response message that is sent by the terminal device based on the DCI. The DCI is used to indicate the terminal device to enter a sleep mode at a first moment, the first DCI format is a DCI format used to indicate scheduling of PDSCH, and the second DCI format is a DCI format used to indicate scheduling of PUSCH.

Further, in a specific implementation, the response message includes a HARQ response. When the DCI is in the first DCI format, the first moment is any one of the following:

- a start moment of an OFDM symbol next to a last orthogonal frequency division multiplexing OFDM symbol of the HARQ response sent by the terminal device;
- a start moment of a slot next to a slot in which the HARQ response sent by the terminal device is located;
- a start moment of an OFDM symbol next to a last OFDM symbol of a PDSCH received by the terminal device; or
- a start moment of a slot next to a slot in which a PDSCH received by the terminal device is located.

Further, in another specific implementation, the response message includes a PUSCH. When the DCI is in the second DCI format, the first moment is any one of the following:

- a start moment of an OFDM symbol next to a last OFDM symbol of the PUSCH sent by the terminal device;
- a start moment of a slot next to a slot in which the PUSCH sent by the terminal device is located;
- a start moment of an OFDM symbol next to a last OFDM symbol in OFDM symbols on which at least one aperiodic channel state information reference signal CSI-RS received by the terminal device is located when transmission of the PDCCH triggers the aperiodic CSI-RS;
- a start moment of a slot next to a last slot in slots in which at least one aperiodic CSI-RS received by the terminal device is located when transmission of the PDCCH triggers the aperiodic CSI-RS;
- a start moment of an OFDM symbol next to an OFDM symbol on which the PDCCH received by the terminal device is located when transmission of the PDCCH does not trigger an aperiodic CSI-RS; or a start moment of a slot next to a slot in which the PDCCH received by the terminal device is located when transmission of the PDCCH does not trigger an aperiodic CSI-RS.

There may be one or more aperiodic CSI-RSs, and the one or more aperiodic CSI-RSs may have a plurality of functions. A function is used for channel measurement, and another function is used for interference measurement, for example, channel state information-interference measurement (CSI-IM).

Optionally, in a specific implementation of this embodiment, the CRC bit of the DCI in the first DCI format or the second DCI format is scrambled by GTS-C-RNTI, and the scrambling of GTS-C-RNTI is used to indicate the terminal device to enter the sleep mode at the first moment and wake up after a first GTS duration ends.

Optionally, in another specific implementation of this embodiment, the DCI in the first DCI format includes a first PDSCH time domain resource allocation index, the first PDSCH time domain resource allocation index is used to determine a first go-to-sleep GTS duration index in a configured PDSCH time domain resource allocation list, and the first GTS duration index is used to determine a first GTS duration for the terminal device, so that the terminal device enters the sleep mode at the first moment and wakes up after the first GTS duration ends.

Alternatively, the DCI in the second DCI format includes a first PUSCH time domain resource allocation index, the first PUSCH time domain resource allocation index is used to determine a first GTS duration index in a configured PUSCH time domain resource allocation list, and the first GTS duration index is used to determine a first GTS duration for the terminal device, so that the terminal device enters the sleep mode at the first moment and wakes up after the first GTS duration ends.

Optionally, in still another specific implementation of this embodiment, the processing unit 802 is configured to: when the receiving unit 801 receives an ACK or the PUSCH sent by the terminal device, determine that the terminal device enters the sleep mode at the first moment.

Optionally, in still another specific implementation of this embodiment, the sending unit 803 is further configured to: before sending, by using the PDCCH, the DCI with the CRC bit, wherein the DCI is in the first DCI format or the second DCI format, send a radio resource control RRC message, where the RRC message is used to configure the first GTS duration for the terminal device.

Optionally, specifically, the RRC message includes a GTS-C-RNTI, where the GTS-C-RNTI is used to indicate, during sending of the PDCCH, the terminal device to enter the sleep mode.

Alternatively, the RRC message includes GTS configuration information, where the GTS configuration information includes the PDSCH time domain resource allocation list or the PUSCH time domain resource allocation list, the PDSCH time domain resource allocation list includes at least one correspondence between a PDSCH time domain resource allocation index and a first GTS duration index, the PUSCH time domain resource allocation list includes at least one correspondence between a PUSCH time domain resource allocation index and a first GTS duration index, and the first GTS duration index is used to indicate the first GTS duration.

When the communications apparatus is configured to receive a message, or the apparatus is used in the terminal device, the processing unit 802 is configured to: detect a PDCCH sent by the network device; and if DCI with a cyclic redundancy check CRC bit, wherein the DCI is in a first DCI format or a second DCI format is detected on the PDCCH, enter a sleep mode at a first moment based on the DCI, where the first DCI format is a DCI format used to indicate scheduling of PDSCH, and the second DCI format is a DCI format used to indicate scheduling of PUSCH. The sending unit 803 is configured to send a response message to the network device based on the DCI.

Optionally, in a specific implementation of this embodiment, the processing unit 802 is specifically configured to: if it is detected that the CRC bit of the DCI in the first DCI format or the second DCI format is processed through GTS-C-RNTI scrambling, determine that the terminal device enters the sleep mode at the first moment.

Optionally, in a specific implementation of this embodiment, the processing unit 802 is specifically configured to: when the DCI in the first DCI format includes a first PDSCH time domain resource allocation index, determine a first go-to-sleep GTS duration index based on the first PDSCH time domain resource allocation index and a PDSCH time domain resource allocation list, determine a first GTS duration based on the first GTS duration index, and enter the sleep mode at the first moment and wake up after the first GTS duration ends.

Alternatively, the processing unit 802 is configured to: when the DCI in the second DCI format includes a first PUSCH time domain resource allocation index, determine a first GTS duration index based on the first PUSCH time domain resource allocation index and a PUSCH time domain resource allocation list, determine a first GTS duration based on the first GTS duration index, and enter the sleep mode at the first moment and wake up after the first GTS duration ends.

Optionally, in another specific implementation of this embodiment, the response message includes an ACK and a PUSCH. The processing unit 802 is specifically configured to: when the sending unit 803 sends the ACK or the PUSCH to the network device, enter the sleep mode at the first moment.

Optionally, in still another specific implementation of this embodiment, the receiving unit 801 is configured to: before the PDCCH sent by the network device is detected, receive a radio resource control RRC message from the network device, where the RRC message is used to configure the first GTS duration for the terminal device.

The RRC message includes a GTS-C-RNTI, where the GTS-C-RNTI is used to indicate, during sending of the PDCCH, the terminal device to enter the sleep mode. Alternatively, the RRC message includes GTS configuration information, where the GTS configuration information includes the PDSCH time domain resource allocation list or the PUSCH time domain resource allocation list, the PDSCH time domain resource allocation list includes at least one correspondence between a PDSCH time domain resource allocation index and a first GTS duration index, the PUSCH time domain resource allocation list includes at least one correspondence between a PUSCH time domain resource allocation index and a first GTS duration index, and the first GTS duration index is used to indicate the first GTS duration.

Figure 9:
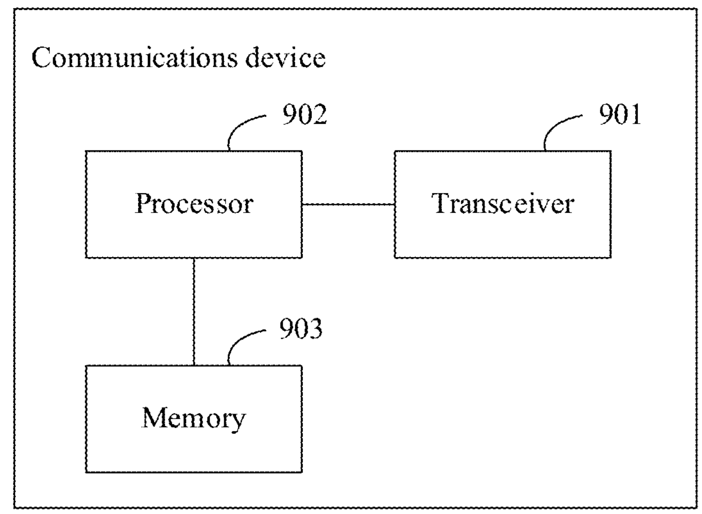
FIG. 9 is a schematic structural diagram of a communications device according to an embodiment of this application.

FIG. 9 is a schematic structural diagram of a communications device according to an embodiment of this application. The communications device may be the network device in the foregoing embodiments, a terminal device, or a component (for example, a chip) that can be used for a terminal device. The communications device may implement functions or operations of the network device and the terminal device in the foregoing embodiments.

Figure 10:
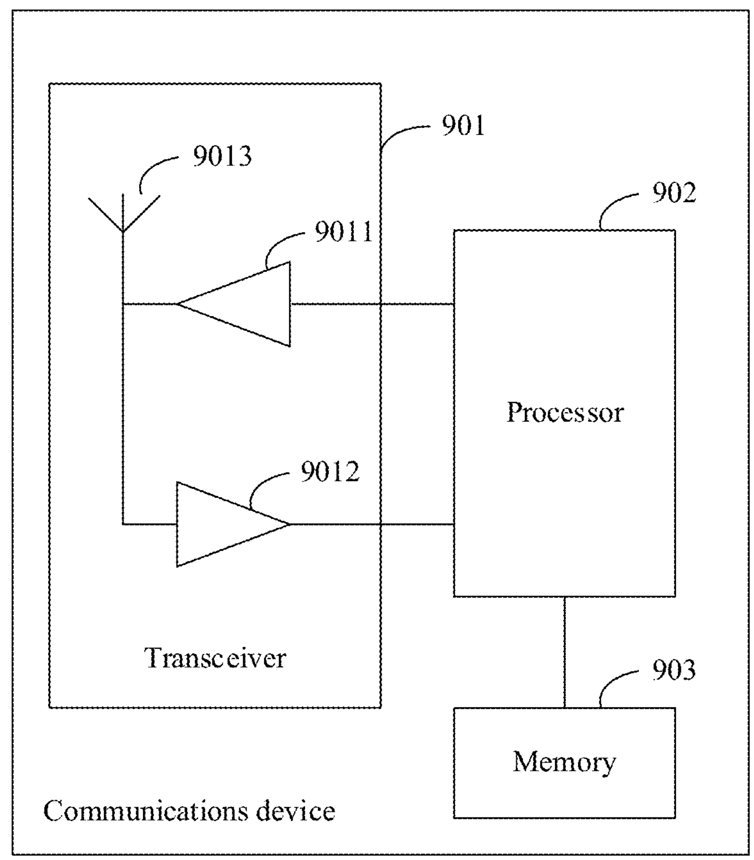
FIG. 10 is a schematic structural diagram of another communications device according to an embodiment of this application.

As shown in FIG. 9, the communications device may include a transceiver 901 and a processor 902, and may further include a memory 903. The memory 903 may be configured to store code or data. The transceiver 901 may include components (as shown in FIG. 10) such as a receiver 9011, a transmitter 9012, and an antenna 9013. The communications device may further include more or fewer components, or combine some components, or have different component arrangements. This is not limited in this application.

The processor 902 is a control center of the communications device, and is connected to each part of the entire communications device through various interfaces and lines.

The processor 902 runs or executes a software program or a module stored in the memory 903, and invokes data stored in the memory 903, to perform various functions of the communications device or process data.

The processor 902 may include an integrated circuit (IC), for example, may include a single packaged IC, or may include a plurality of connected packaged ICs with a same function or different functions. For example, the processor 902 may include only a central processing unit (CPU), or may be a combination of a GPU, a digital signal processor (DSP), and a control chip (for example, a baseband chip) in a transceiver module. In various implementations of this application, the CPU may be a single computing core, or may include a plurality of computing cores.

Optionally, the processor 902 includes a processing chip. The processing chip may include one or more random access storage units. The storage unit may be configured to store instructions or computer programs.

The transceiver 901 is configured to establish a communications channel, so that the communications device is connected to a communications network through the communications channel, to implement communication transmission between the communications device and another device. The transceiver 901 may be a module that completes receiving and sending functions. For example, the transceiver 901 may include communications modules such as a wireless local area network (WLAN) module, a Bluetooth module, and a baseband module, and a radio frequency (RF) circuit corresponding to the communications device. The transceiver 901 is configured to perform communication in a wireless local area network, Bluetooth communication, infrared communication, and/or communication in a cellular communications system, for example, wideband code division multiple access (WCDMA) and/or high speed downlink packet access (HSDPA). The transceiver 901 is configured to control communication between components in the communications device, and may support direct memory access.

In different implementations of this application, transceiver modules in the transceiver 901 are usually presented in a form of an integrated circuit chip, and may be selectively combined, without requiring that all the transceiver modules and corresponding antenna groups are included. For example, the transceiver 901 may include only a baseband chip, a radio frequency chip, and a corresponding antenna, to provide a communication function in a cellular communications system. The communications device may be connected to a cellular network or the internet through a communication connection, for example, wireless local area network access or WCDMA access, that is established by the transceiver.

The memory 903 may include a volatile memory, for example, a random access memory (RAM), or may include a non-volatile memory, for example, a flash memory, a hard disk drive (HDD), or a solid-state drive (SSD). Alternatively, the memory 903 may include a combination of the foregoing types of memories. The memory may store a program, code, or data, and the processor 902 in the communications device may implement a function of the communications apparatus by executing the program or the code.

In this embodiment of this application, the processor 902 and the transceiver 901 may independently exist or may be coupled, to implement all or some of the steps of the message sending method and the message receiving method in the foregoing method embodiments. For example, when the communications device is used as the network device in the foregoing embodiments, for example, a base station, the transceiver 901 may send, by using a PDCCH, downlink control information DCI that has a CRC bit and that is in a first DCI format or a second DCI format, and receive a response message that is sent by a terminal device based on the DCI. When the communications device is used as the terminal device in the foregoing embodiments, for example, UE, the processor 902 may detect the PDCCH sent by the network device, and enter a sleep mode at a first moment based on the DCI when finding, through detection, the DCI that has the CRC bit. In addition, the transceiver 901 may be configured to send the response message to the network device based on the DCI.

Further, a function to be implemented by the receiving unit 801 and the sending unit 803 in FIG. 8 may be implemented by the transceiver 901 of the communications device, or may be implemented by the transceiver 901 controlled by the processor 902, and a function to be implemented by the processing unit 802 may be implemented by the processor 902.

In addition, this application further provides a computer storage medium. The computer storage medium may store a program, and when the program is executed, some or all of the steps of the embodiments of the message sending method and the message receiving method provided in this application may be included. The storage medium may be a magnetic disk, an optical disc, a read-only memory ROM, a random access memory RAM, or the like.

All or some of the foregoing embodiments may be implemented by using software, hardware, firmware, or any combination thereof. When software is used for implementation, all or some of the embodiments may be implemented in a form of a computer program product.

The computer program product includes one or more computer instructions, for example, switching instructions. When the computer instructions are loaded and executed on a computer, all or some of the procedures or functions are generated according to the embodiments of this application. The computer may be a general-purpose computer, a dedicated computer, a computer network, or another programmable apparatus.

The computer instructions may be stored in a computer-readable storage medium, or may be transmitted from a computer-readable storage medium to another computer-readable storage medium. For example, the computer instructions may be transmitted from a website, a computer, a server, or a data center to another station, computer, server, or data center in a wired or wireless manner.

The computer-readable storage medium may be any usable medium accessible by a computer, or a storage device, such as a server or a data center, integrating one or more usable media. The usable medium may be a magnetic medium, for example, a floppy disk, a hard disk, a magnetic tape, an optical medium (for example, a DVD), or a semiconductor medium such as a solid-state drive SSD.

In the specification, claims, and the accompanying drawings of this application, the terms "first", "second", and the like are intended to distinguish similar objects but do not necessarily indicate a specific order or sequence. It should be understood that, the data termed in such a way is interchangeable in proper circumstances, so that the embodiments described herein can be implemented in an order other than the order illustrated or described herein. In addition, the terms "include", "have" and any other variants thereof are intended to cover non-exclusive inclusion. For example, a process, method, system, product, or device that includes a list of steps or units is not necessarily limited to those steps or units that are expressly listed, but may include other steps or units that are not expressly listed or inherent to the process, method, product, or device.

A person skilled in the art may clearly understand that, the technologies in the embodiments of this application may be implemented by software in combination with a necessary general hardware platform. Based on such an understanding, the technical solutions in the embodiments of this application essentially, or the part contributing to the conventional technology may be implemented in the form of a software product. The computer software product may be stored in a storage medium, such as a ROM/RAM, a magnetic disk, or an optical disc, and includes several instructions for indicating a computer device (which may be a personal computer, a server, or a network device) to perform the methods described in the embodiments or some parts of the embodiments of the present invention.

For same or similar parts in the embodiments in this specification, refer to each other. Especially, a network device/node or an apparatus device is basically similar to a method embodiment, and therefore is described briefly. For related parts, refer to the descriptions of the method embodiments.

The foregoing implementations of this application do not constitute a limitation on the protection scope of this application.

What is claimed is:

1. A message sending method, wherein the method comprises: sending, by a network device via a physical downlink control channel (PDCCH), downlink control information (DCI) with a cyclic redundancy check (CRC) bit, wherein the DCI is in a second DCI format, wherein the DCI is used to indicate to a terminal device to enter a sleep mode at a first moment, the second DCI format is a DCI format used to indicate a scheduling of a physical uplink shared channel (PUSCH), and the first moment is a start moment of a slot next to a slot in which the PDCCH received by the terminal device is located when transmission of the PDCCH does not trigger an aperiodic channel state information reference signal (CSI-RS); and receiving, by the network device, a response message that is sent by the terminal device based on the DCI, the response message comprising a hybrid automatic repeat request (HARQ) response or a PUSCH.

2. The method according to claim 1, wherein the response message comprises the PUSCH.

3. The method according to claim 1, wherein the CRC bit of the DCI is processed through go-to-sleep cell radio network temporary identifier (GTS-C-RNTI) scrambling, and the GTS-C-RNTI scrambling is used to indicate to the terminal device to enter the sleep mode at the first moment and wake up after a first go-to-sleep (GTS) duration ends.

4. The method according to claim 1, wherein the DCI in the second DCI format comprises a first PUSCH time domain resource allocation index, the first PUSCH time domain resource allocation index is used to determine a first GTS duration index in a configured PUSCH time domain resource allocation list, and the first GTS duration index is used to determine a first GTS duration for the terminal device, so that the terminal device enters the sleep mode at the first moment and wakes up after the first GTS duration ends.

5. A message receiving method, wherein the method comprises: detecting, by a terminal device, a physical downlink control channel (PDCCH) sent by a network device; if downlink control information (DCI) with a cyclic redundancy check (CRC) bit is found on the PDCCH through detection, entering, by the terminal device, a sleep mode at a first moment based on the DCI, wherein the DCI is in a second DCI format, the second DCI format is a DCI format used to indicate a scheduling of a physical uplink shared channel (PUSCH), and the first moment is a start moment of a slot next to a slot in which the PDCCH received by the terminal device is located when transmission of the PDCCH does not trigger an aperiodic channel state information reference signal (CSI-RS); and sending, by the terminal device, a response message to the network device based on the DCI, the response message comprising a hybrid automatic repeat request (HARQ) response or a PUSCH.

6. The method according to claim 5, wherein the response message comprises the PUSCH.

7. The method according to claim 5, wherein the entering, by the terminal device, a sleep mode at a first moment based on the DCI comprises:

if it is detected that the CRC bit of the DCI is processed through go-to-sleep cell radio network temporary identifier (GTS-C-RNTI) scrambling, determining that the terminal device enters the sleep mode at the first moment and wakes up after a first go-to-sleep (GTS) duration ends.

8. The method according to claim 5, wherein the entering, by the terminal device, a sleep mode at a first moment based on the DCI comprises:

when the DCI in the second DCI format comprises a first PUSCH time domain resource allocation index, determining, by the terminal device, a first GTS duration index based on the first PUSCH time domain resource allocation index and a PUSCH time domain resource allocation list, determining a first GTS duration based on the first GTS duration index, and entering the sleep mode at the first moment and waking up after the first GTS duration ends.

9. A communications apparatus, wherein the apparatus comprises: a transmitter, configured to send, by using a physical downlink control channel (PDCCH), downlink control information (DCI) with a cyclic redundancy check (CRC) bit, wherein the DCI is in a second DCI format, wherein the DCI is used to indicate a terminal device to enter a sleep mode at a first moment, the second DCI format is a DCI format used to indicate a scheduling of a physical uplink shared channel (PUSCH), and the first moment is a start moment of a slot next to a slot in which the PDCCH received by the terminal device is located when transmission of the PDCCH does not trigger an aperiodic channel state information reference signal (CSI-RS); and a receiver, configured to receive a response message that is sent by the terminal device based on the DCI, the response message comprising a hybrid automatic repeat request (HARQ) response or a PUSCH.

10. The apparatus according to claim 9, wherein the response message comprises the PUSCH.

11. The apparatus according to claim 9, wherein the CRC bit of the DCI is processed through go-to-sleep cell radio network temporary identifier (GTS-C-RNTI) scrambling, and the GTS-C-RNTI scrambling is used to indicate the terminal device to enter the sleep mode at the first moment and wake up after a first go-to-sleep (GTS) duration ends.

12. The apparatus according to claim 9, wherein the DCI in the second DCI format comprises a first PUSCH time domain resource allocation index, the first PUSCH time domain resource allocation index is used to determine a first GTS duration index in a configured PUSCH time domain resource allocation list, and the first GTS duration index is used to determine a first GTS duration for the terminal device, so that the terminal device enters the sleep mode at the first moment and wakes up after the first GTS duration ends.

13. A communications apparatus, the apparatus comprises: a processor, configured to: detect a physical downlink control channel (PDCCH) sent by a network device; and if downlink control information (DCI) with a cyclic redundancy check (CRC) bit is found on the PDCCH through detection, enter a sleep mode at a first moment based on the DCI, wherein the DCI is in a second DCI format, the second DCI format is a DCI format used to indicate a scheduling of a physical uplink shared channel (PUSCH), and the first moment is a start moment of a slot next to a slot in which the PDCCH received by the apparatus is located when transmission of the PDCCH does not trigger an aperiodic channel state information reference signal (CSI-RS); and a transmitter, configured to send a response message to the network device based on the DCII the response message comprising a hybrid automatic repeat request (HARQ) response or a PUSCH.

14. The apparatus according to claim 13, wherein the response message comprises the PUSCH.

15. The apparatus according to claim 13, wherein the processor is configured to: if it is detected that the CRC bit of the DCI is processed through go-to-sleep cell radio network temporary identifier (GTS-C-RNTI) scrambling, decide to enter the sleep mode at the first moment and wake up after a first go-to-sleep (GTS) duration ends, wherein the apparatus is a terminal device or the apparatus is used in the terminal device.

16. The apparatus according to claim 13, wherein when the DCI in the second DCI format comprises a first PUSCH time domain resource allocation index, determine a first GTS duration index based on the first PUSCH time domain resource allocation index and a PUSCH time domain resource allocation list, determine a first GTS duration based on the first GTS duration index, and enter the sleep mode at the first moment and wake up after the first GTS duration ends.

* * * * *

UNITED STATES PATENT AND TRADEMARK OFFICE

CERTIFICATE OF CORRECTION

PATENT NO. : 12,101,780 B2
APPLICATION NO. : 17/366258
DATED : September 24, 2024
INVENTOR(S) : Lixia Xue It is certified that error appears in the above-identified patent and that said Letters Patent is hereby corrected as shown below:

On the Title Page

Item (57), in Column 2, in “Abstract”, Line 5, delete “s a” and insert -- a --.

In the Specification

In Column 1, Line 9, delete “flied” and insert -- filed --.

In the Claims

In Column 29, Line 18, in Claim 13, delete “DCII” and insert -- DCI, --.

Signed and Sealed this
Third Day of December, 2024

Katherine Kelly Vidal

Katherine Kelly Vidal
*Director of the United States Patent and Trademark Office*